United States Patent
Jablonski et al.

(10) Patent No.: US 7,372,880 B2
(45) Date of Patent: May 13, 2008

(54) OPTICAL PULSE LASERS

(75) Inventors: Mark Kenneth Jablonski, Tokyo (JP); Sze Yun Set, Tokyo (JP); Yuichi Tanaka, Tokyo (JP)

(73) Assignee: Alnair Labs Corporation, Kawaguchi, Saitama-ken (JP)

( * ) Notice: Subject to any disclaimer, the term of this patent is extended or adjusted under 35 U.S.C. 154(b) by 0 days.

(21) Appl. No.: 10/537,900

(22) PCT Filed: Dec. 22, 2003

(86) PCT No.: PCT/US03/41091

§ 371 (c)(1),
(2), (4) Date: Dec. 29, 2005

(87) PCT Pub. No.: WO2004/059806

PCT Pub. Date: Jul. 15, 2004

(65) Prior Publication Data
US 2006/0198399 A1    Sep. 7, 2006

Related U.S. Application Data

(60) Provisional application No. 60/435,577, filed on Dec. 20, 2002.

(51) Int. Cl.
*H01S 3/13* (2006.01)
(52) U.S. Cl. .............. 372/30; 372/18; 372/10
(58) Field of Classification Search ............ 372/30
See application file for complete search history.

(56) References Cited

U.S. PATENT DOCUMENTS

| | | | |
|---|---|---|---|
| 3,978,429 A | 8/1976 | Ippen et al. | |
| 4,019,156 A | 4/1977 | Fountain et al. | |
| 4,191,931 A | 3/1980 | Kuppenheimer | |
| 4,435,809 A | 3/1984 | Tsang et al. | |
| 4,597,638 A | 7/1986 | Chemla et al. | |
| 4,665,524 A | 5/1987 | Cotter | |
| 5,119,382 A | 6/1992 | Kennedy et al. | |
| 5,408,480 A | 4/1995 | Hemmati | |

(Continued)

FOREIGN PATENT DOCUMENTS

DE    19946182    3/2001

(Continued)

OTHER PUBLICATIONS

Ando, T (1997) "Excitation in Carbon Nanotubes," *J. Phys Soc. Jpn.* 66:1066-.

(Continued)

*Primary Examiner*—Dung T. Nguyen
(74) *Attorney, Agent, or Firm*—Greenlee, Winner and Sullivan, P.C.

(57) ABSTRACT

The present invention provides pulsed lasers which employ carbon nanotubes, particularly layers of carbon nanotubes, as saturable absorbers, mode lockers or for Q-switching elements. The present invention also provides methods and materials for mode-locking and Q-switching of lasers in which carbon nanotubes are employed as non-linear optical materials and/or saturable absorbers which facilitate mode-locking and/or Q-switching. The invention further provides mode locker and Q-switching elements or devices which comprise one or more layers containing carbon nanotubes which layer or layers function for mode locking and/or Q-switching.

33 Claims, 32 Drawing Sheets

U.S. PATENT DOCUMENTS

| | | | |
|---|---|---|---|
| 5,482,601 | A | 1/1996 | Ohshima et al. |
| 5,502,737 | A | 3/1996 | Chartier et al. |
| 5,689,519 | A | 11/1997 | Fermann et al. |
| 5,753,088 | A | 5/1998 | Olk |
| 5,764,679 | A | 6/1998 | Shen et al. |
| 5,802,084 | A | 9/1998 | Bowera et al. |
| 5,812,308 | A | 9/1998 | Kafka et al. |
| 5,844,932 | A | 12/1998 | Thony et al. |
| 6,023,479 | A | 2/2000 | Thony et al. |
| 6,183,714 | B1 | 2/2001 | Smalley et al. |
| 6,252,892 | B1 | 6/2001 | Jiang et al. |
| 6,303,904 | B1 | 10/2001 | Iwatsubo |
| 6,331,209 | B1 | 12/2001 | Jang et al. |
| 6,331,262 | B1 | 12/2001 | Haddeon et al. |
| 6,331,690 | B1 | 12/2001 | Yudasaka et al. |
| 6,333,016 | B1 | 12/2001 | Resasco et al. |
| 6,350,488 | B1 | 2/2002 | Lee et al. |
| 6,361,861 | B2 | 3/2002 | Gao et al. |
| 6,413,487 | B1 | 7/2002 | Resasco et al. |
| 6,455,021 | B1 | 9/2002 | Saito |
| 6,539,041 | B1* | 3/2003 | Scheps ............... 372/53 |
| 6,749,826 | B2 | 6/2004 | Tillotson et al. |
| 2002/0176650 | A1 | 11/2002 | Zhao et al. |
| 2004/0109652 | A1* | 6/2004 | Risch et al. ............ 385/102 |
| 2005/0069669 | A1* | 3/2005 | Sakaibara et al. ...... 428/64.4 |

FOREIGN PATENT DOCUMENTS

| | | |
|---|---|---|
| JP | 200248392 | 10/1990 |
| JP | 2000223012 | 8/2000 |
| JP | 2003121892 | 4/2003 |
| JP | 2003248251 | 9/2003 |
| JP | 2004046084 | 2/2004 |
| JP | 2004280028 | 10/2004 |
| WO | WO 03/034142 | 4/2003 |

OTHER PUBLICATIONS

Brabec et al. (1992) "Kerr Lens Mode0Locking," *Optics Letters* 17:1292-1294.

Chen et al. (2002) "Ultrafast Optical Switch Properties of Single-Wall Carbon Nanotube Polymer Composites," *CLEO* pp. 660, Paper CFH4.

Chen et al. (2002) "Ultrafast Optical Switch Properties of Single-Wall Carbon Nanotube Polymer Composites at 1.55µm," *Appl. Phys. Lett.* 81(6):975-977.

Collins et al. "Optical Switching of Single-Wall Carbon Nanotube Absorption Through Fled Gating,".

Doran et al. (1988) "Non-Linear Optical Loop Mirror," *Opt. Lett.* 14:56-58.

DeSouza et al. (1993) "Saturable Absorber Modelocked Polarisation Maintaining Erbium-Doped Fibers," *Electron. Lett.* 29:447-449.

Fermann, M.E. (1994) "Ultrashort-Pulse Sources Based on Single-Mode Rare0Earth-Doped Fibers," *J. Appl. Phys. B* B58:197-209.

Fermann et al. (1990) "Nonlinear Amplifying Loop Mirror," *Opt. Lett.* 15:752-754.

Ichida et al. (2002) "Coulomb Effects on the Fundamental Optical Transition in Semiconducting Single-Walled Carbon Nanotubes: Divergent Behavior in the Small Diameter Limit," *Phys. Rev.* B65.

Ichida et al. (1999) "Excitation Effects of Optical Transitions in Single-Walled Carbon Nanotubes," *J. Phys. Soc. Jpn.* 68:3131-3133.

Ippen et al. (1989) "Additive Pulse Modelocking," *J. Opti. Soc. America B, Opt. Phys.* 6:1736-1745.

Kataura et al. (1999) "Optical Properties of Single-Walled Carbon Nanotubes," *Synthetic Metals* 103:2555-2558.

Kataura et al. (2000) "Diameter Control of Single-Walled Carbon Nanotubes," *Carbon* 38:1691-1697.

Keller et al. (1992) "Solid-State Low-Loss Intracavity Saturable Absorber for Nd:YLF Lasers: An Antiresonant Semiconductor Fabry-Perot Saturable Absorber," *Opt. Lett.* 17(7):505-507.

Keller et al. (1996) "Semiconductor Saturable Absorber Mirrors (SESSAM's) for Femtosecond to Nanosecond Pulse Generation in Solid-State Lasers," *IEEE J. Select Topics Quant. Electron.* 2:435-453.

Mark et al. (1989) "Femtosecond Pulse Generation in a Laser with Nonlinear External Resonator," *Opt. Lett.* 14:48-50.

Maruyama et al. (2003) "Synthesis of Single-Walled Carbon Nanotubes with Narrow Diameter-Distribution from Fullerene," *Chem. Phys. Lett.* 375:553-559.

Maruyama et al. (2002) "Low-Temperature Synthesis of High-Purity Single-Walled Carbon Nanotubes from Alcohol," *Chem. Phys. Lett.* 360:229-234.

Matsas et al. (1992) "Selfstarting Passively Mode-Locked Fibre Ring Solution Laser Exploiting Nonlinear Polarisation Rotation," *Electron. Lett.* 28:1391-1393.

Nishide et al. (2003) "High-Yield Production of Single-Wall Carbon Nanotubes in Notrogen Gas,".

Sakakibara et al. (2003) "Near-Infared Saturable Absorption of Sinlge-Wall Carbon Nanotubes Prepared by Laser Ablation Method," *Jpn. J. Appl. Phys.* 42:494-496.

Set et al. (2003) "A Noise Suppressing Saturable Absorber at 1550 nm Based on Carbon Nanotube Technology," OFC'03, Atlanta, Mar. 23-28, Paper FL2.

Set et al. (2003) "Mode-Locked Fiber Lasers Based on Saturable Absorber Incorporating Carbon Nanotubes," OFC'03, Atlanta, Mar. 23-28, Post Deadline Paper PD44.

Set et al. (2003) "A Dual-Regime Mode-Locked/Q-Switched Laser Using a Saturable Absorber Incorporating Carbon Nanotubes (SAINT)," in Proc. CLEO'03, Baltimore, MD paper PDC-A13.

Spence et al. (1991) "60-fsec Pulse Generation from a Self-Mode-Locked Ti: Sapphire Laser," *Opt. Lett.* 16:42-44.

Tatsuura et al. (2003) "Semiconductor Carbon Nanotubes as Ultrafast Switching Materials for Optical Telecommunications," *Adv. Mater.* 15:534-537.

Wildoer et al. (1998) "Electronic Structure of Atomically Resolved Carbon Nanotubes," *Nature* 391:59-62.

Wong et al. (1997) "Self-Switching of Optical Pulses n Dispersion-Imbalanced Nonlinear Loop Mirrors," *Opt. Lett.* 22:1150-1152.

Nakazawa, M., Suzuki, K., Kubota, H., and Kimura, Y., "Active Q Switching and Mode Locking in a 1.53-µm Fiber Ring Laser with Saturable Absorption in Erbium-Doped Fiber at 4.2K," *Optics Lett.* 18(1993):1526-1528, Washington, U.S.

Malyarevich, A.M., Denisov, I. A., Yumashev, K.V., Dymshits, O.S., Zhilin A.A., and Kang, U., "Cobalt-doped Transparent Glass Ceramic as a Saturable Absorber Q Switch for Erbium:glass Lasers," *Appl. Optics* 40(24):4322-4325.

Prasankumar, R.P., Chudoba, C. and Fujimoto, J.G., "Self-starting Mode Locking in a Cr:forsterite Laser by Use of Non-epitaxially-grown Semiconductor-doped Silica Films," *Optics Lett.* 27(17)(2002):1564-1566.

Guina, M., et al., "Harmonic Mode-locked Fiber Laser with Semiconductor Saturable Absorber and Amplitued Modulation," *CLEO* 2002 pp. 562-563.

Haus, H. (Mar. 1976) "Parameter Ranges for CW Passive Mode Locking," *IEEE J. Quantum Electron.* QE12(3):169-176.

Haus, H. (1975) "Theory of Mode Locking with a Fast Saturable Absorber," *J. Appl. Phys.* 46:3049-3058.

Haus, H. (1975) "Theory of Locking with a Slow Saturable Absorber," *IEEE J. Quantum. Electron.* 11(9):736-746.

Honninger et al. (1999) "Q-Switching Stability Limits of Continuous-Wave Passive Mode Locking," *J. Opt. Soc. Am.* B16:46-56.

Jiang et al. (Aug. 1999) "Nonlinearly Limited Saturable-Absorber Mode Locking of an Erbium Fiber Laser," *Optics Lett.* 24(15):1074-1076.

Keller et al. (Sep. 1996) "Semiconductor Saturable Absorber Mirrors (SESSAM's) for Femtosecond to Nanosecond Pulse Generation in Solid-State Lasers," *IEEE J. Select. Top. Quantum Electron.* 2(3):435-453.

Parmigiani et al. (Mar. 2005) "Amplitude and Timing Jitter Reduction Using a Fiber NOLM Incorporating a Fiber Bragg Grafting Based Pulse Shaper," OFC Anaheim, Mar. 6-11, OME.

* cited by examiner (Low Peak Power)

(High Peak Power)

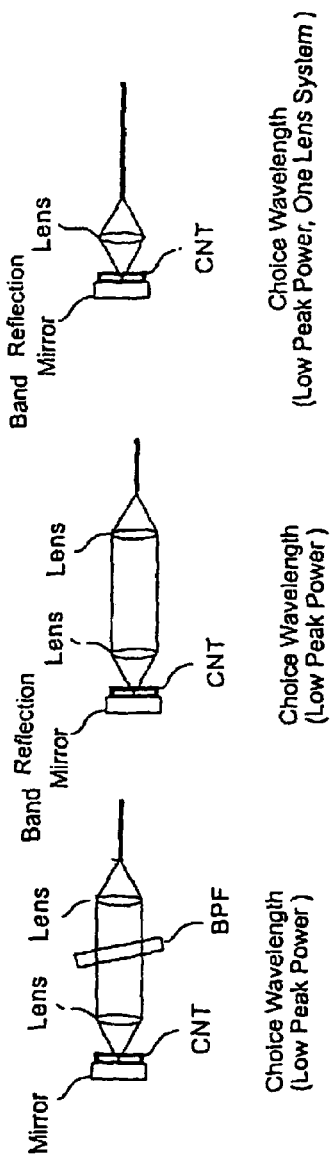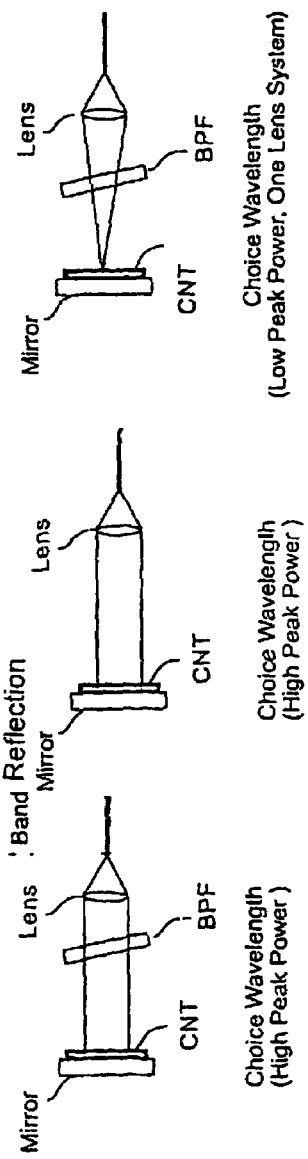
Fig. 17U — Choice Wavelength (Low Peak Power)
Fig. 17V — Choice Wavelength (Low Peak Power)
Fig. 17W — Choice Wavelength (Low Peak Power, One Lens System)
Fig. 17X — Choice Wavelength (High Peak Power)
Fig. 17Y — Choice Wavelength (High Peak Power)
Fig. 17Z — Choice Wavelength (Low Peak Power, One Lens System)

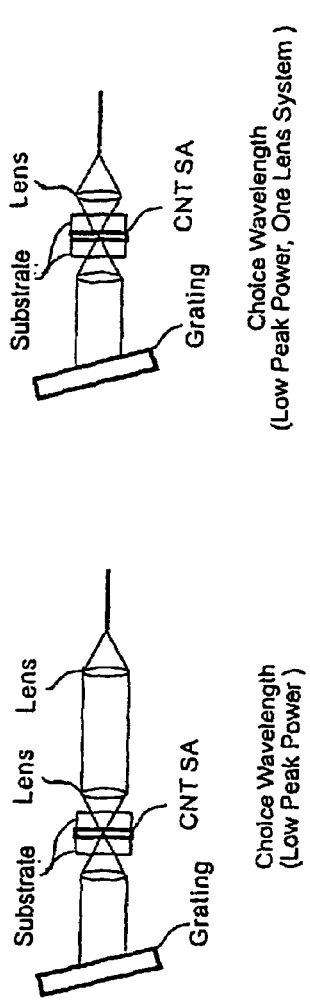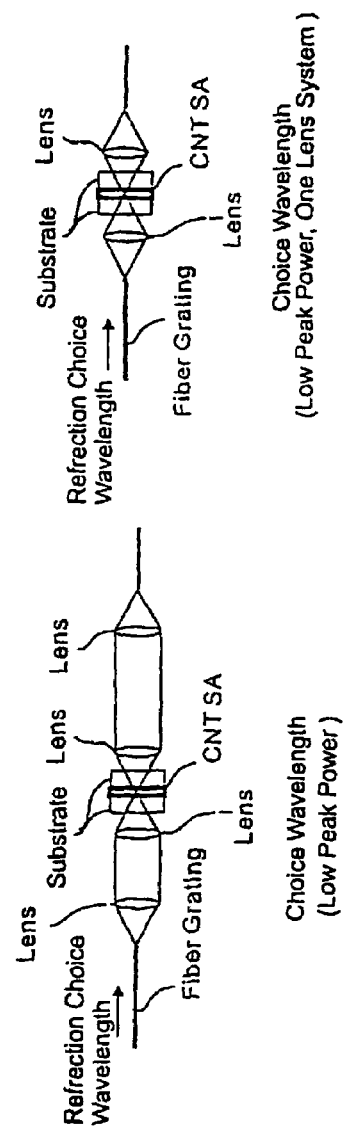
Fig. 17AA
Fig. 17AB
Fig. 17AC
Fig. 17AD

Saturable Absober Waveguide

Saturable Absober & Gain Waveguide

Saturable Absober & Gain & Mode Lock Waveguide

Saturable Absober & Gain Waveguide

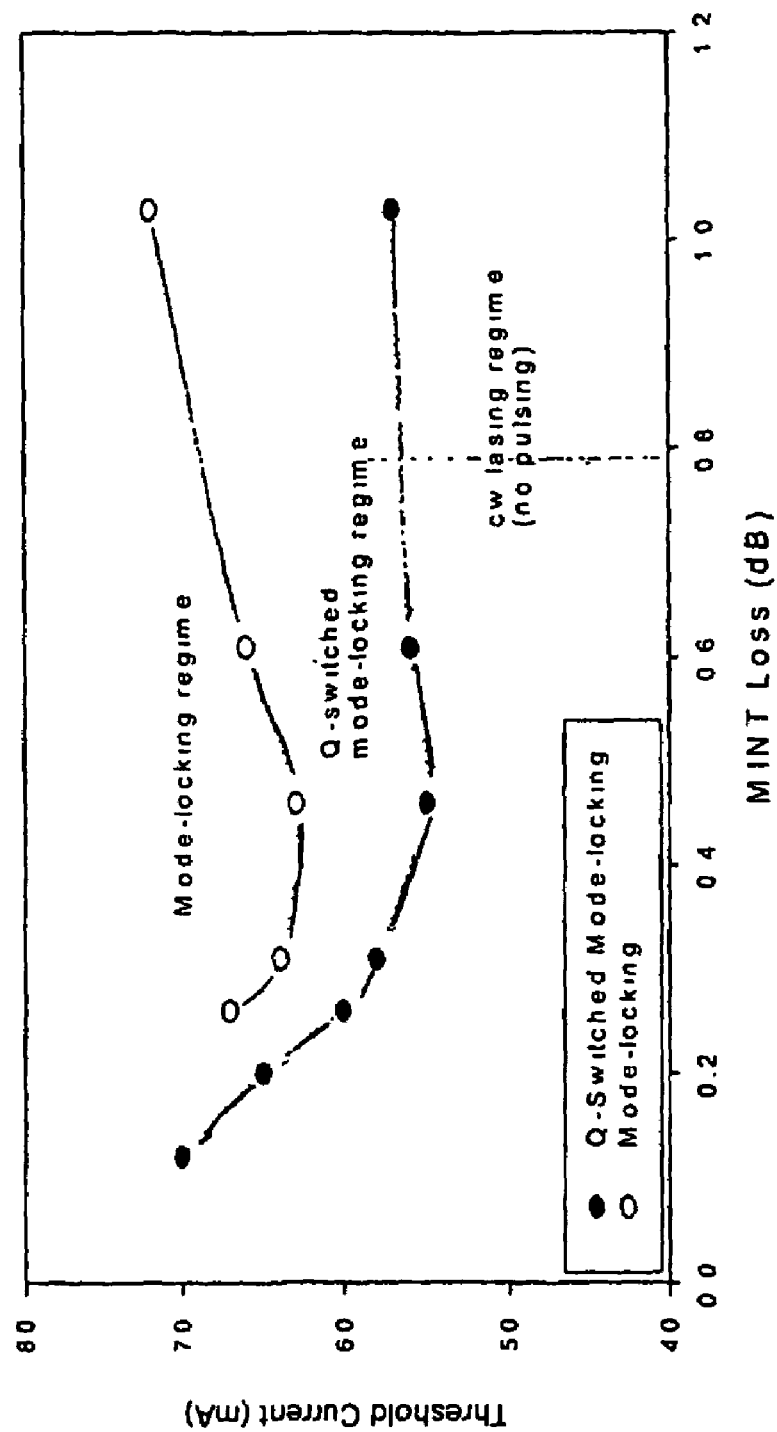
Fig. 21 Laser pulsing threshold and operating regimes.

OPTICAL PULSE LASERS

CROSS-REFERENCE TO RELATED APPLICATIONS

This application is a 371 national stage of PCT/US2003/041091, filed Dec. 22, 2003, and takes priority under 37 CFR 119(e) to U.S. provisional application Ser. No. 60/435,577, filed Dec. 20, 2002, both of which are incorporated by reference in their entirety herein.

FIELD OF THE INVENTION

The present invention is related to lasers, and more specifically, to optical pulse lasers employing nonlinear optical and/or saturable absorber elements and devices incorporating carbon nanotubes to achieve mode locking and/or Q-switching.

BACKGROUND OF THE INVENTION

Optical pulse lasers have great potential for applications in various fields, such as optical communications, optical signal processing, laser surgery, biomedicine, optical diagnostics, two-photon microscopy, optical probing, optical reflectometry, material processing, etc. There are two main classes of optical pulse lasers, namely mode-locked lasers and Q-switched lasers. Mode-locked lasers can produce ultra-short optical pulses at high repetition rates, whereas Q-switched lasers are generally used for generating high-energy pulses at relatively low repetition rates.

As is known in the art, a mode-locked laser has multiple longitudinal modes that oscillate simultaneously with their relative phases locked to each other at fixed relationship generating uniformly spaced pulses. The longitudinal modes are defined by the effective path length of the laser resonator. In order to achieve mode locking, a mode-locking mechanism is required to synchronize the phases of the lasing modes so that the phase differences between all lasing modes remain constant. These optically phase-locked modes then interfere with each other to form optical pulses. Two broad classes of mode-locking schemes, active mode locking, and passive mode locking, are typically used and various methods and devices are known in the art for implementing such mode-locking schemes. U.S. Pat. Nos. 3,978,429; 4,019,156; 4,435,809; 4,665,524; 5,764,679; 5,802,084; and 5,812,308 provide examples of mode-locked lasers.

Active mode-locking schemes employ an intensity or phase modulator in the laser cavity operating at frequencies equal to the fundamental cavity frequency, or at an integer multiple or a rational multiple of the fundamental cavity frequency. An example of active mode locking is provided in U.S. Pat. No. 4,019,156.

In contrast, passive mode-locking schemes use at least one nonlinear optical element or device in the lasing cavity, or within a cavity external, but optically coupled, to the lasing cavity, that possess an intensity-dependent response to favor optical pulse formation over continuous-wave lasing. A passively mode-locked laser requires at least one nonlinear optical element as a mode-locker. A nonlinear optical element could possess properties such as amplitude nonlinearity (absorption as a nonlinear function of input optical intensity), Kerr-type (phase or refractive index as a nonlinear function of input optical intensity) nonlinearity, or a combination of both to facilitate mode locking. Amplitude nonlinearity could be provided by device such as a saturable absorber with a fast recovery lifetime in the order of picoseconds, such as the MQW semiconductor (amongst all available saturable absorbers, there are few which possess a fast response in the picosecond regime). Alternatively, Kerr-type nonlinearity, such as those implemented in the interferometric pulse addition method [see for example, Mark, 1989, or Ippen, 1989] and the Kerr-lens method (Kerr-focusing, self-focusing) [see for example, Spence, 1991, or Brabec 1992], could be used to provide an ultra-fast laser mode-locking mechanism. Although not a saturable absorber, the non-linear optical properties such as the Kerr effect, give an artificial "saturable absorber" effect, which has a response time much faster than any intrinsic saturable absorber.

A saturable absorber is a material that displays a change in its optical transparency dependent on the incident optical intensity in a specific operating wavelength region. In a linear regime, where the incident optical intensity is weak, the saturable absorber absorbs the incident light, resulting in attenuation of the optical intensity of the incident light. When the incident optical intensity is raised to a higher level, saturation of absorption occurs and absorption by the saturable absorber decreases, resulting in a decrease in attenuation of the optical intensity of the incident light. This kind of intensity-dependent attenuation allows the high intensity components of the pulse to pass through but not the low intensity components, such as the pulse wings, pedestals and background cw radiation. When a saturable absorber is placed in a lasing cavity, it will favor pulsing modes over cw modes. However, not all saturable absorbers are suitable for ultra-short-pulse mode-locking application. The important properties of a laser mode-locker are the saturation fluence, recovery time, and nonlinear/linear-absorption ratio. The saturation fluence will affect laser operating power level, which is limited by the device damage threshold. The recovery time limits the shortest achievable pulse width and the laser operating regime. For a given saturable fluence and recovery time, the laser could operate in one of four different operating regimes: cw lasing (without pulsing), Q-switching, Q-switched mode-locking, and cw mode-locking. A fast device recovery time, in picosecond and sub-picosecond regimes, is required for ultra-short pulse generation, whilst a slow recovery time, in the nanosecond regime, could give raise to Q-switching modes. However, a slow recovery time is also essential for self-starting of a mode-locked laser. Therefore, a mode locker, is a type-of saturable absorber that exhibits additional properties beneficial for functioning to mode lock a laser. A mode locker material, which is the functional material in a mode-locker element or device useful in laser configuration herein, should preferably possess both a fast and a slow recovery time in order to be used effectively in a pulsed laser operating in the picosecond and sub-picosecond regimes. There are many materials possessing nonlinear properties (such as saturable absorption) that do not possess the properties of a mode-locker. The CNT materials including layers containing SWNTs, or a combination of SWNTs and MWNTs exhibit mode-locker properties.

Passive mode-locked lasers are exemplified in U.S. Pat. Nos. 3,978,429 and 4,435,809. Hybrid mode-locked lasers which combine active and passive mode locking mechanisms are also known. An example of hybrid mode-locked laser is disclosed in U.S. Pat. No. 4,019,156.

Q-switching and self-starting (initiate pulsing) of lasers also employ non-linear optical materials and/or saturable absorbers. Passive Q-switched lasers are exemplified in: U.S. Pat. Nos. 4,191,931; 5,119,382; and 5,408,480.

The most commonly known saturable absorbers for laser mode-locking and Q-switching are materials such as an organic dye medium [see for example, Ippen, 1976] or a multi-quantum well (MQW) semiconductor device [see for example, Chemla, 1986, or Keller, 1992].

Organic materials such as dyes can exhibit a broadband absorption response over hundreds of nanometers. However, the use of dyes in laser configurations requires the use of mechanical elements such as nozzles, which are bulky and subject to mechanical malfunction and are not easily integrable with solid state lasers. At longer wavelength in the infrared region, particular at the telecom wavelength of 1550 nm, the available dye media are easily damaged by visible light, making it more difficult to handle such materials.

MQW (multiple quantum well)semiconductor devices require complex and costly fabrication systems, such as MOCVD (metal organic chemical vapor deposition) or MOVPE (metal-organic vapor-phase epitaxy, and may require additional substrate removal process. Furthermore, high-energy (4 MeV~12 MeV), heavy-ion implantation is required to reduce the device recovery time (typically a few nanoseconds) to a few picosecond for laser mode-locking. The MQW saturable absorber can only be used in reflection mode, therefore requiring inclusion of an optical circulator, which increases the total device insertion loss. Additionally, MQW-based devices may require expensive hermetic packaging for long-tern environmental stability, and may not withstand high optical input powers. So far, no alternative material useful as a saturable absorber at 1550 nm has been found to challenge MQW-based saturable absorbers.

Thus, there is a need in the art for materials that exhibit non-linear optical properties and materials which function as saturable absorbers for use in laser and other optical device applications. This invention relates to the use of new saturable absorber materials, carbon nanotubes, and particularly single walled carbon nanotubes, for use in laser applications.

It has recently been reported that single-wall carbon nanotubes (SWNTs) exhibit saturable absorption [Y.-C. Chen, et al., 2002a and Y. Sakakibara, et al., 2003], and the potential application for such material as optical switches was proposed [Y.-C. Chen, et al., 2002a ; Y.-C. Chen, et al., 2002b; and Y. Sakakibara, et al., 2003]. International application WO03/034142 reports the saturable absorption properties of SWNTs and certain optical devices that include SWNTs. The Z-scan measurement technique which was used in the studies presented does not measure device response time. In separate studies, the recovery time of a thin layer containing SWNTs was measured to be <1 ps using pump-probe experiments [Y.-C. Chen, et al., 2002 a; Y.-C. Chen, et al., 2002b; and S. Tatsuura, et al., 2003]. Recently, a SWNT-based saturable absorber called "Saturable Absorber Incorporating NanoTube" (SAINT) was reported for use in optical noise suppression of ultrafast optical pulses in the picosecond regime [S. Y. Set, et al., 2003a].

Certain aspects of this invention have been reported. A passively mode-locked fiber laser using SAINT as a mode-locker was reported [S. Y. Set, et al. 2003b]. A Q-switched laser using SAINT as a Q-switch was reported [S. Y. Set, et al. 2003c].

SUMMARY OF THE INVENTION

It is an object of this invention to provide pulsed lasers employing carbon nanotubes as non-linear optical or saturable absorber materials to facilitate pulse generation. In particular, the invention relates to the use of carbon nanotubes as non-linear optical or saturable absorbers in pulsed laser configurations.

It is an object of the present invention to provide optical pulses from a mode-locked laser and/or a Q-switched laser using a saturable absorber incorporating carbon nanotubes. The optical pulse lasers of this invention use carbon nanotubes as a non-linear optical material and/or a saturable absorber for passive mode-locking and/or Q-switching, and offer several advantages over conventional materials used as saturable absorbers, such as MQW semiconductor devices. These advantages include: very fast recovery time (on the order of 1 picosecond or less), high optical damage threshold in vacuum or an inert gas environment, mechanical and environmental robustness, chemical stability, ease of fabrication, preferably at lower cost, and the ability to operate both in transmission (uni-direction), reflection and bi-directional modes. Non-linear optical carbon nanotube materials of this invention, in particular, allow the fabrication lasers with very short pulse length (on the order of 1-10 femtoseconds), similar to pulse lengths achievable using non-linear optical semiconductor materials, but which can operate in both the transmission, reflection and bi-directional modes.

A laser configuration of the invention comprises a resonator containing a gain medium (or gain cavity), a source of excitation to produce optical gain in the gain medium and a non-linear optical device, particularly a saturable absorber device comprising carbon nanotubes into which light from the resonator can be optically coupled. The non-linear optical material produces an intensity dependent absorption at the lasing wavelength. Optical pulses can be generated in such a laser configuration by mode locking, and/or Q-switching, dependent on the optical power of the pump beam and the location of the focusing region on the carbon nanotube layer.

In a more specific embodiment, a laser configuration is provided having an optical ring resonator, a optical pump light source which provides an excitation beam at a selected wavelength or within a specified spectral range, a gain medium disposed in the resonator responsive to the pump beam excitation to produce optical gain over the operating spectral range of the laser, a saturable absorber comprising carbon nanotubes and a means for coupling light from the resonator into the saturable absorber. The laser configuration may also include optical isolators to ensure uni-directional lasing operation, and a wavelength tunable optical bandpass filter to define the laser operating wavelength. The saturable absorber preferably comprises a thin layer, preferably 10 micron or less for given applications, of carbon nanotubes to produce an intensity dependent absorption at the lasing wavelength.

Another specific laser configuration of the invention includes a linear resonator (gain cavity) defined by two reflective elements, an optical pump light source which provides a excitation beam at a selected wavelength or within a specified spectral range, a fiber gain medium disposed in the resonator responsive to the pump beam excitation to produce optical gain over the operating spectral range of the laser, and a carbon nanotube saturable absorber into which light from the resonator can be coupled. In a specific example, the carbon nanotube saturable absorber can be provided as a layer coated, sprayed or otherwise deposited onto one of the reflecting elements of the cavity to achieve mode-locking.

In alternative embodiments, the carbon nanotube saturable absorber of this invention can be employed in any art known laser configuration for mode-locking, and/or Q-switching. For example, the carbon nanotube saturable absorber of this invention can be employed in hybrid mode locked fiber lasers, sigma lasers, colliding pulse mode-locking lasers, solid-state lasers, figure-eight lasers, nonlinear polarization rotation lasers among other cavity designs. In specific embodiments, the non-linear optical or saturable absorber elements or devices of this invention containing carbon nanotubes, e.g., as one or more layers on or between substrates, can be employed as mode lockers, Q switchers and in Q spoiler devices.

In these exemplary laser configurations a wavelength coupler can be employed to couple the pump excitation beam into the gain medium. Various art-known wavelength couplers can be employed. For example, one or more optical lenses in the resonator can be employed to couple light into the saturable absorber. Optical pulses can be generated using these laser configurations by mode locking, and/or Q-switching. The carbon nanotube saturable absorber of this invention can initiate(self-start) and mode-lock a laser of various laser configurations to produce pulses ranging from picosecond-femtosecond pulses. It is believed that the intensity dependent absorption of the carbon nanotube result from the present of a limited number of exciton-absorption centers which give rise to a bleachable absorption. Further facilitating the function of these materials as saturable absorbers is the intensity dependent nonlinear phase-shift in the carbon nanotube material which gives rise to a Kerr-type nonlinear lensing effect. These effects are exploited to mode-lock a laser to produce ultra-short optical pulses.

The invention provides various optical device elements that contain a saturable absorber which comprises carbon nanotubes. Device elements of the invention include saturable absorber devices or elements, laser-mode locking devices, laser Q-switching devices and devices for laser mode-locking and Q-switching. Generally, the invention encompasses any optical device element which employs carbon nanotubes as a mode locking element or device or a Q-switching element or device. In these elements and devices, the diameter of the carbon nanotubes can be selected to absorb within a selected operating wavelength range. Alternatively, in these elements and devices, the carbon nanotubes can be selected to have a range of different diameters to provide a wide operating bandwidth, for example a mixture of carbon nanotubes of different diameters can be employed. The invention includes mode-locking and Q-switching elements and devices which are capable of operation in both bi-direction and uni-direction and which are capable of operation in both reflection and transmission mode.

In specific embodiments, the invention provided mode-locking and Q-switching elements and devices having one or more layers containing carbon nanotubes (e.g., SWNTs or a mixture of SWNTs and MWNTs). In other preferred embodiments, non-linear optical and saturable absorber elements and devices of this invention contain a non-linear optical material or a saturable absorber that consists essentially of carbon nanotubes, particularly SWNTS, which may be provided in one or more layers in which a layer consists essentially of carbon nanotubes, particularly SWNTs. Carbon nanotube layers are provided on the substrate and the substrate is positioned within the element or device and the element or device is positioned in operation to received light from a source (e.g., laser light) which passes through a carbon nanotube layer. These elements and devices may further comprise or be combined with other optical elements, including optical filters which may be fixed wavelength or tunable(e.g., bandpass filters), reflective surfaces (e.g., mirrors), pulse shaping elements (e.g., short lengths of single-mode fiber). In these elements and devices the layer or layers can be of uniform thickness. Alternatively, the thickness of the carbon nanotube layers can be uniformly varied. In particular, the carbon nanotube layer thickness can be varied to adjust the mode-locking and/or Q-switching threshold optical energy. In specific embodiments, the mode-locking and Q-switching elements or devices comprise one or more substrates having one or more layers comprising carbon nanotubes on one or more surfaces of the one or more substrates. More specifically, these elements or devices can comprise a substrate having a carbon nanotube layer on one surfaces and the other surface (or face) of the substrate is optionally provided with an anti-reflection (AR) coating, a bandpass filter or a less than fully reflective mirror (i.e., a mirror having reflectivity of less than 99%, e.g., having reflectivity between about 1% to less than about 99%). Examples of less than fully reflective mirrors include mirrors with reflectivity in the range of about 10% to about 90% reflectivity and half-mirrors (reflectivity of about 50%).

In specific embodiments, the invention provides pulsed lasers comprises one or more of the above mode-locking and/or Q-switching elements or devices. In other specific embodiments, the invention provides pulsed lasers which comprise one or more mode-locking and/or Q-switching elements or devices of this invention containing carbon nanotubes in combination with one or more art-known active or passive mode-locking and/or Q-switching elements or devices which do not contain carbon nanotubes. Active mode-locking devices which may be combined with the elements and devices for mode locking and Q switching of this invention include intensity modulators, phase modulators, or acousto-optic modulators Additionally, the invention provides waveguides, including among others, ridge waveguides or optical fibers, which comprise or incorporate carbon nanotubes in the optical path through the waveguide. Carbon nanotubes can be coated onto desired portions of waveguides and/or layers of these materials can be grown on surfaces or in structures (e.g., grooves) formed on waveguide surfaces employing chemical vapor deposition or other methods known in the art. The invention further relates to optical devices comprising one or more waveguides comprising carbon nanotubes in the optical path through the waveguide. The carbon nanotubes present in the waveguide optical path are present in a sufficient amount therein to function as a non-linear optical material and/or a saturable absorber.

The non-linear optical material or saturable absorber comprises carbon nanotubes which may be single-walled (SWNTs), multiple-walled (MWNTs) or a mixture containing both types of carbon nanotubes. In preferred embodiments, the non-linear optical material or saturable absorber comprises carbon nanotubes which are SWNTs, or mixtures of SWNTs and MWNTs. In one preferred saturable absorber device a layer, film or coating of carbon nanotubes is provided on a face of a substrate. The other face of the substrate can optionally be provided with an anti-reflective (AR) coating, a bandpass filter, or a mirror with less than full reflectivity. In an alternative configuration of a saturable absorber device, carbon nanotubes can be provided as a layer between opposed inner faces of two substrates. The external faces of the substrates may be provided with AR coatings, a bandpass filter or a mirror having less than full reflectivity.

The mode-locking and/or Q-switching elements and devices of this invention comprise carbon nanotubes as non-linear optical materials and/or saturable absorbers can be combined in optical device configurations, e.g., in pulsed laser configuration, with known saturable absorber elements and devices (not based on carbon nanotubes) and devices for achieving active or passive mode locking and Q-switching. Art-known elements and devices with which the mode-locking and/or Q-switching elements and devices of this invention can be combined include, among others, semiconductor saturable absorber mirrors, dye saturable absorbers, nonlinear loop mirrors, nonlinear polarization rotation switches, Kerr lensing devices, self-focusing, solution-effect, coupled cavity mode-locking devices, additive pulse mode locking devices and a colliding pulse mode locking devices.

The invention also provides methods for generating laser light pulses (optical pulses) employing a mode-locked, Q-switched laser or hybrid laser, combining mode-locking and Q-switching, of this invention. The method involves the step of providing a mode locker or a Q-switcher which comprises carbon nanotubes. The mode locker or Q-switcher is optically coupled to the resonator in a laser configuration. Any laser configuration known in the art can be employed and in particular the laser can be a ring laser, a Fabry-Perot (FP) linear resonator configuration laser, a Sigma configuration laser, or a colliding pulse mode-locking (CPM) configuration laser, among others. The method further comprises providing one or more non-linear optical materials or saturable absorbers other than those which contain carbon nanotubes which is also optically coupled to the laser resonator in the laser configuration. The elements, devices and lasers of this invention can also be employed in a method for passively mode-locking a laser to generate short optical pulses. The invention can provide devices and methods which generated short optical pulses (at various desired wavelengths, but particularly in the wavelength range useful for optical communications) that are <5 picosec, <2 picosec, <1 picosec, <500 femtosec, <100 femtosec, <50 femtosec, or <10 femtosec (and all subranges thereof) in length.

BRIEF DESCRIPTION OF THE FIGURES

FIG. 12A illustrates a unidirectional ring configuration. FIG. 12B illustrates a bidirectional ring configuration and the application of colliding pulse mode locking (CPM). FIG. 12C illustrates a unidirectional ring configuration with hybrid mode locking.

FIG. 13A is a linear configuration with a filter separate from a mirror); FIG. 13B illustrates a hybrid mode-locking linear configuration, corresponding to the configuration of FIG. 13A, with filter separate from mirror with an optically coupled modulator; FIG. 13C illustrates a linear configuration with reflection mirror as filter and mirror; FIG. 13D illustrates a linear laser configuration with a CNT saturable absorber and the reflection mirror as single element; FIG. 13E illustrates a linear laser configuration with the reflection mirror, filter and CNT saturable absorber layer combined in a single optical element; The configurations of FIGS. 13C-E can be implemented in a hybrid mode-locking configuration as illustrated in FIG. 13B by optically coupling a modulator into the illustrated configuration; The element labeled gain represents a source of amplified laser light, such as a resonator or amplifier that is pumped with appropriate wavelength radiation; Half-mirrors illustrated in FIG. 13A-E can be any not fully reflective mirror, e.g., a mirror with less than 99% reflectivity;

FIG. 14A is a linear free space configuration with lens coupling into the CNT layer preferred for use for low peak power; The interference distance is illustrated; FIG. 14B is a configuration similar to that of FIG. 14A with lens coupling preferred for high peak power; FIG. 14C is a generic illustration of a free space laser configuration illustrating that changing the distance of interference with result in a change in frequency (and wavelength) of the laser. FIG. 14D is a generic free space laser configuration as in FIG. 14C in which the Er-doped glass is replaced with SOA;

FIG. 15A-C are three different Sigma free space laser configurations with different placements of the saturable absorber element;

FIGS. 16C-E illustrates means for adjusting the laser wavelength and the laser repetition rate in a laser configuration of FIGS. 16A and B; Focusing the optical beam at different points along the length of the laser element (illustrated as the x-direction) changes the laser wavelength). In FIG. 16D the laser wavelength is shifted to shorter wavelength; In FIG. 16E the laser wavelength is shifted to longer wavelength.

FIG. 17A illustrates a device configuration in which a CNT layer (170) is sandwiched between two substrate layers (175) and in which antireflective coatings (180) can be provided or in which one of the AR coatings can be replaced with a bandpass filter layer(181). FIG. 17B illustrates a simple configuration in which one substrate surface has a CNT layer and the other surface has an AR coating. FIG. 17C illustrates a more complex reflection-mode device configuration with a CNT layer sandwiched between substrates (175) and an internal mirro or band reflection mirror (190). The outer Ar coating (180a) is optional. FIG. 17J positions the CNT layer between two half mirrors (195). The sandwiched CNT layer is then sandwiched between tow substrate layers (175). The substrate layers may be coated with an AR coating or a bandpass filter as illustrated. FIG. 17K illustrates a device configuration in which the CNT layer is sandwiched between two substrate layers and the outer substrate surfaces are provided with half mirrors (195) or a bandpass filter (181) as illustrated. FIG. 17L illustrates a configuration for use in reflection mode in which a CNT layer and a mirror or band reflection mirror (200) is sandwiched between two substrate layers. The outer surfaces of the substrate is provided with a half mirror as indicated. FIG. 17M also illustrates a device configuration for reflection mode in which a CNT layer is sandwiched between a half mirror and a mirror or band reflection mirror (200). The CNT/mirror layers are then sandwiched between two substrate layers and the outer surface of the substrate can be provided with an AR coating as illustrated. The half mirrors in these configurations can be replaced with less than full reflectivity mirrors (i.e, mirrors having reflectivity less than 99%).

FIG. 17R is the basic configuration with a CNT layer on a substrate. FIGS. 17S-T are complex saturable absorber mirror (SAM) configurations. The device configurations of FIGS. 17S and T can be used in all of the laser configurations of FIGS. 17U-17Z.

FIGS. 17AA-17AD illustrate complex Grating-type configurations for low peak power use. These configurations use the saturable absorber configuration of FIG. 17A. Similar Grating-type configurations can be employed in which the incident light is parallel for use in high peak power structures.

FIG. 18A illustrates a waveguide element having multiple waveguides. FIG. 18B is an enlargement of several waveguides of the element of FIG. 18A. FIG. 18C is a saturable absorber waveguide. FIG. 18D is a saturable absorber and Gain waveguide in which the waveguide is Er-doped. FIG. 18E is a saturable absorber, gain and mode locked waveguide. In which the waveguide element is provided with mirrors, as illustrated. FIG. 18E is a saturable absorber and gain waveguide in which a portion of the waveguide is doped with CNT (or has a CNT layer) and a second portion of the waveguide is an active waveguide (i.e., doped with Er).

FIG. 21 is a graph of threshold current (mA) as a function of MINT loss(db) illustrating the laser pulsing threshold and operating regimes for mode locking and Q-switching.

DETAILED DESCRIPTION OF THE INVENTION

Figure 1:
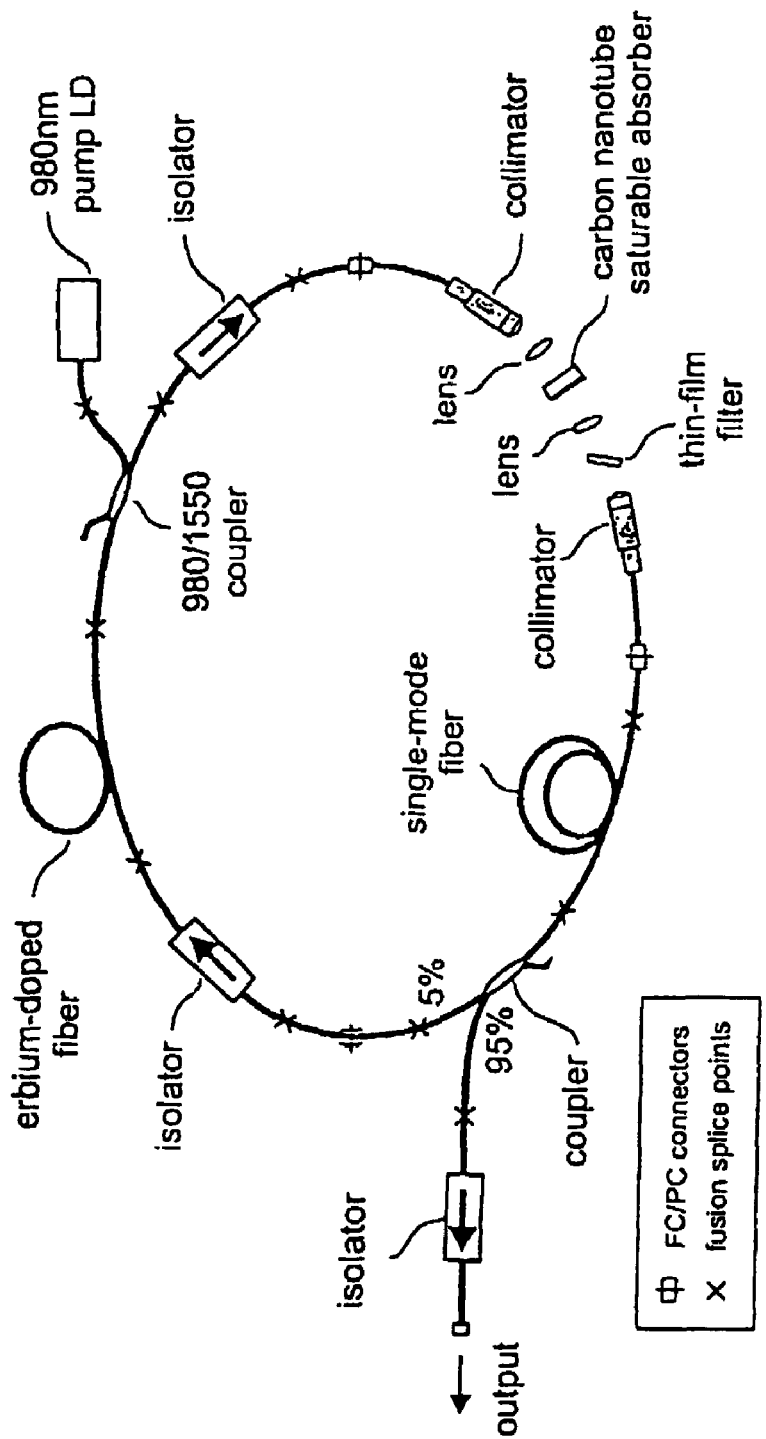
FIG. 1 illustrates the configuration of an optical pulse laser, passively mode locked using a carbon nanotube saturable absorber in a ring cavity, according to a first exemplary embodiment of the present invention; the figure illustrates the use of particular exemplary active fiber and pump laser and particular collimator/lens combinations for coupling to the passive mode-locking element (the CNT saturable absorber); The positioning of FC/PC connectors and fusion splice points are illustrated for a specific configuration.

The term "carbon nanotubes" is used broadly herein to encompass all materials that have been referred to in the art by this name. An ideal nanotube is a hexagonal network of carbon atoms formed into a seamless cylinder with diameters on the order of nanometers and lengths that can be up to tens of microns. The ends of carbon nanotubes are typically capped with half of a fullerene molecule. Carbon nanotubes may be single-walled or multi-walled. The nanotubes may have a zigzag, armchair or helical configurations. The nanotubes may be semiconductor carbon nanotubes or metallic carbon nanotubes as defined in J. W. G. Wildoer, et. Al., 1998

General information about the types, structures and properties of carbon nanotubes as well as methods of synthesis of carbon nanotubes can be found in P. J. F. Harris (2001) and D. Tomanek and R. Enbody (eds) 2000. Carbon nanotube materials containing SWNTs, MWNTs or mixtures thereof, with varying levels of purity, and made by various methods are commercially available from various commercial sources including among others Sigma-Aldrich (St. Louis, Mo.), MER (Tucson, Ark.), Buckey USA (Houston, Tex.), Hyperion Catalysis International, Inc. (Cambridge, Mass.), Carbon Nanotechnologies (Houston, Tex.), Nanocs (New York, N.Y.), and Nano Labs (Brighton, Mass.). Applied Nanotechnologies, Inc. (ANI, Chapel Hill, N.C.) is a commercial source of SWNT films on various substrates including glass, silicon and metal with film thicknesses ranging from submicron to about 10 micron.

Carbon nanotubes may have also been called "graphite whiskers"; "filament carbons"; "graphite fibers"; "extra fine carbon tubes"; "carbon tubes"; "carbon fibrils"; "carbon micro tubes" or "carbon nanofibers". Materials called by any of the listed names or other names employed in the art that have the structures and properties of materials currently called carbon nanotubes are encompassed within the term carbon nanotubes as used herein.

Various methods are known in the art for the synthesis of carbon nanotubes (CNT). CNT usefull as nonlinear optical materials in this invention can be prepared by any art-known method. Methods of synthesis and purification in the following references can be employed, for example, to make carbon nanotube materials for use in the present invention as non-linear optical materials and/or as saturable absorbers: U.S. Pat. Nos. 6,455,021; 6,331,262; 6,413,487; 6,361,861; 6,333,016; 6,331,209; 6,350,488; 6,331,690; 6,303,904; 6,183,714; 5,753,088; 5,482,601.

Preferably, carbon nanotubes are prepared using a laser ablation technique, optionally followed by purification (as described below.). Preferably, the synthetic method allows for control of the diameter of the carbon nanotubes. Diameter-controlled fabrication of SWNTs is described for example in Kataura-et al, 2000 and in U.S. Pat. No. 6,331,690. Carbon nanotubes can be coating on substrate and/or waveguide surfaces by spraying or otherwise distributing a solution or suspension of carbon nanotubes in a solvent or liquid which can then be evaporated to leave a layer, film or coating on the surface. Additionally chemical vapor deposition techniques as known in the art can be used to prepare films, layers and/or coatings on substrates or waveguides. See for example: U.S. Pat. No. 6,350,488; 6331,209; 6,361, 861. A recent synthetic method using alcohol (Maruyama et al., 2002, a low-temperature alcohol catalytic CVD method) can be used to grow SWNTs directly on to substrates or in grooves or waveguides.

Carbon nanotubes which are semiconductor carbon nanotubes and those that are metallic carbon nanotubes can be employed. See: Wilder et al., 1998. CNT samples can contain single-walled carbon nanotubes, multi-walled carbon nanotubes or a mixture thereof. Preferred mixtures of carbon nanotubes contain substantial amounts (greater than 50% by weight of the carbon nanotubes present) of single-walled nanotubes which may contain lower levels of multi-walled carbon nanotubes and other impurities, including amorphous carbon, carbon Nan particles, metals or metal ions or Nan particles containing metals. Metals may be employed as catalysts in the synthesis of carbon nanotubes. Experiments were performed using a carbon nanotube sample believed to contain substantially semiconductor single-walled nanotubes prepared by laser ablation methods described below. Samples in which the diameter or diameter distribution of the carbon nanotube sample can be selected to be between about 0.6 to about 2 nm are preferred. This range of diameters corresponds generally to a wavelength range between 1.03 micrometers and 2.64 micrometers for the S1 or semiconductor first order band. Higher order bands, like S2, S3, S4, etc. give shorter wavelengths. For example, the corresponding S2 band would be between 517 nm and 1380 nanometers.

In order to avoid confusion, the device which possesses properties suitable for ultra-fast laser mode-locking, previously referred to as SAINT, will be referred to herein as a MINT, Mode-locker Incorporating NanoTubes, to classify it as a special class of saturable absorber having such properties suitable for ultra-fast mode-locking. These suitable properties consist of both a fast and a slow recovery time for mode-locking and self-starting, respectively, of a laser (with the fast component dominating over slow component so that mode-locking will dominates over Q-switching mode), a suitable level of saturation fluence depending on the laser peak pulsed power to facilitate stable mode-locking (a laser will not mode-lock if the saturation fluence is too high, and will become unstable if the saturation fluence is too low.), a suitable nonlinear absorption level (high saturable absorption level could give rise to Q-switch instabilities, whilst mode-locking will not occur if the saturable absorption level is too small) an absorption level in the range of about 0.2 dB to about 1.2 dB is found to be a good mode-locking operating range (see FIG. 21).

The invention is further illustrated by reference to the drawings. FIG. 1 illustrates the configuration of an optical pulse laser passively mode locked using a carbon nanotube (CNT) as a non-linear optical material (NLO) or saturable absorber (SA) in a ring cavity. In this system, the cavity is a fiber ring cavity comprising a length of rare-earth doped fiber amplifier as a gain medium. The medium is preferably doped with at least one kind of rare-earth ion, which is preferably erbium (Er), for operation at 1550 nm wavelength region. Other dopants may be employed to provide gain in other operating wavelengths, for example doping with $Yb^{+3}$ would provide gain in the 1030 nm range. Additionally, co-doping techniques such as Er-Ytterbium co-doping may be employed to further increase the gain-per-length of the fiber amplifier and hence reducing the total cavity length for a higher repetition rate. An Er-doped fiber as shown in FIG. 1 is excited by a pump light source, which preferably is a laser diode (LD) with a wavelength shorter than that of the laser operating wavelength of the gain medium. Commercially available 980 nm pump-LDs are usually capable of providing optical power of 100 mW or over when driven with 200 mA of supply current.

A 980 nm LD is used in conjunction with a 980/1550 wavelength coupler, which couples the pump light into the Er-doped fiber (EDF) with low loss. Two optical isolators are employed to ensure uni-directional operation of the ring laser, and to prevent back reflections into the Er-doped fiber gain medium. Output light from the EDF is launched through a fiber collimator and a focusing aspherical lens, onto a thin layer of CNT, which was spray coated on a quartz substrate. Depending upon the distance of the CNT layer from the focusing aspherical lens, the intensity of the incident light onto the carbon nanotube can be varied. Since the CNT has resilient properties, it is preferred to place the CNT layer at the focal point where the optical intensity of the focuses light is highest (~5 micron spot-size) to achieve the best effect. Output light from the CNT is collected and launched back into the fiber cavity via another set of matching aspherical lens and collimator.

Optionally, an optical bandpass filter, such as a thin-film filter, is inserted into the resonance cavity to wavelength tune the laser. For example, an angle-tunable optical bandpass filter can be used as illustrated in FIG. 1. An angle-tunable optical bandpass filter having loss of about 3-dB and bandwidth (BW) of 7 nm can be employed. A short length of single-mode fiber (SMF) can be used for pulse shaping and to further assist ultra-short pulse operation. The output of the laser is tapped through a 95% port of a fiber coupler, and the other 5% port is used for feed back into the cavity. This configuration yields a higher output optical power compared to the standard 10% output tapping. The intracavity power is defined by the saturation power of the gain-medium, a 95% output tapping will give 9.5 times more power than 10% output tapping. This is possible because of the low threshold operation of the laser. The threshold pump power with 95% output tapping and 5% cavity feedback is as low as 15 mW. (Fiber lasers using MQW devices for mode-locking have a typical threshold pump power of 60 mW, even with 10% output tapping.) An optical isolator can also be placed at the output port of the laser to prevent back reflection into the laser cavity, which could destabilize the laser.

Figure 4:
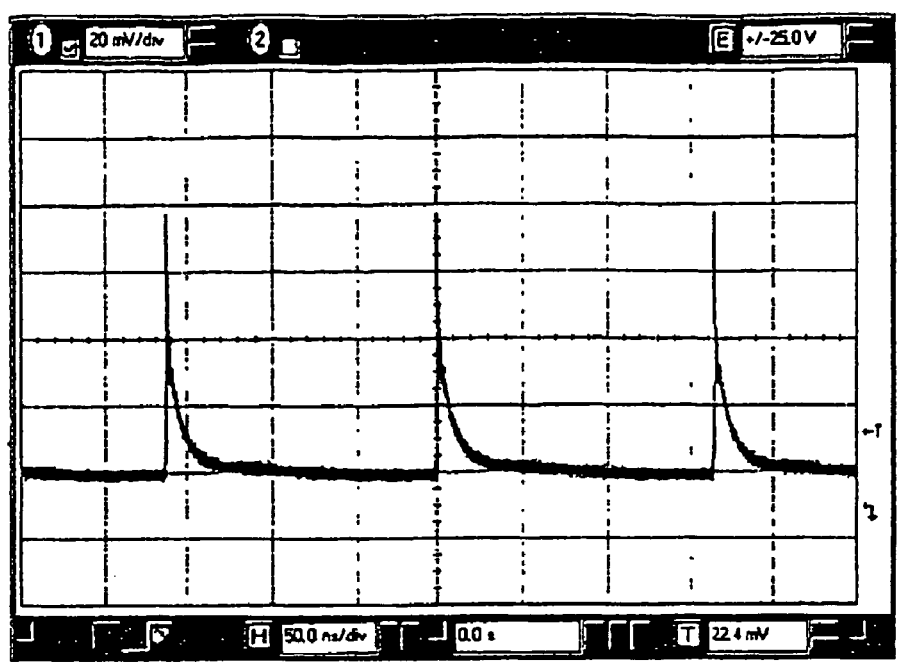
FIG. 4 shows a sampling oscilloscope trace of mode-locked optical pulses generated from a laser configuration of FIG. 1, showing a fundamental pulsing repetition rate of 6.1 MHz.
Figure 5:
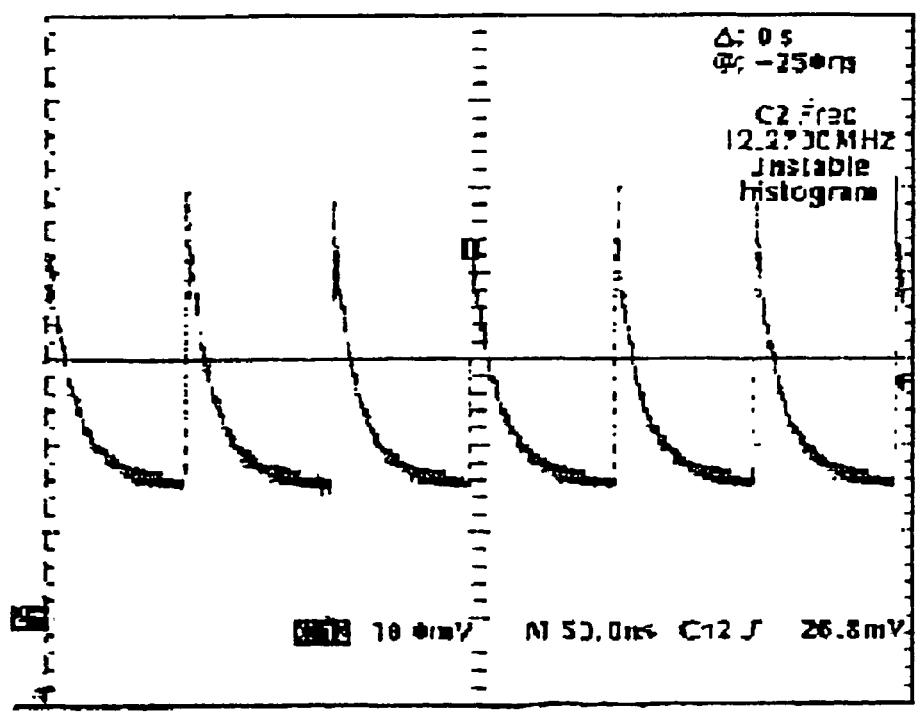
FIG. 5 shows a sampling oscilloscope trace of mode-locked optical pulses generated from a laser configuration of FIG. 1, operating at a second-harmonic repetition rate of 12.2 MHz.

The saturable absorption property of the CNT serves at least in part to mode-lock the laser as well as to initiate (self-start) the pulsing operation. The mode-locked laser of FIG. 1 has a very low threshold power. When the pump LD is turned on to a level of around 18 mW (45 mA pump current) optical pump power, the laser starts to mode lock and produce multiple pulses in a round trip time. However, after the laser has started pulsing, the pump power can be reduced to a level around 14 mW (37 mA pump current) and the laser will still maintain pulsing, in the single-pulse mode with a fundamental repetition rate of 6.1 MHz, as shown in FIG. 4. The output average optical power is measured to be −5.8 dBm. At pump powers higher than about 15 mW, the laser will operate in multiple-pulse mode resulting in a higher-harmonic repetition rate at the multiples of the fundamental round trip frequency of 6.1 MHz. One example is shown in FIG. 5, where the laser is mode-locked at the second harmonic repetition rate of 12.2 MHz. The average output power of the laser increases linearly with the number of pulses in the cavity.

Figure 2:
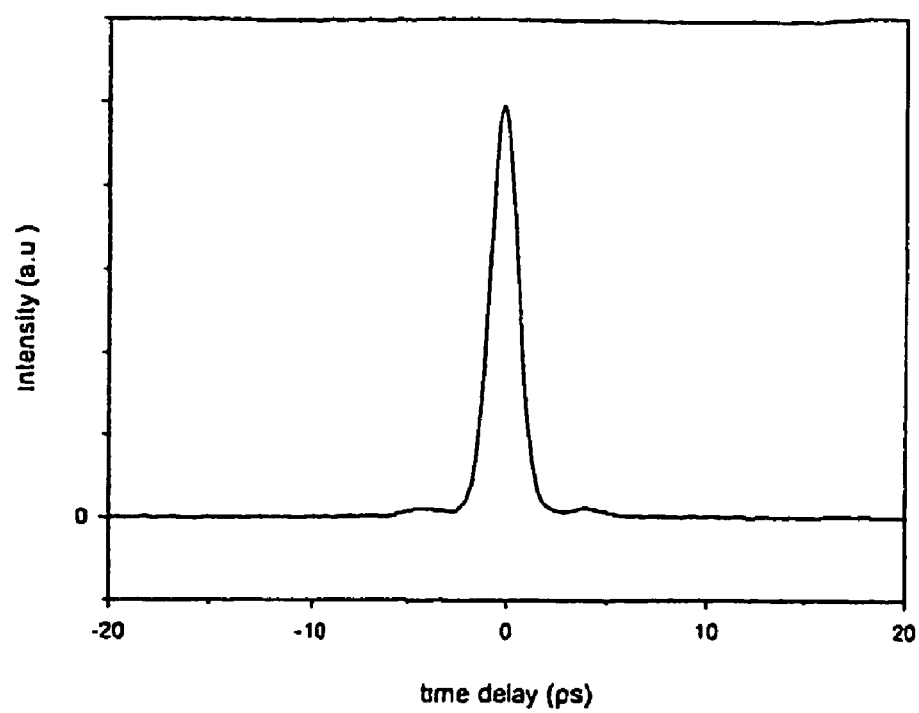
FIG. 2 depicts an autocorrelation trace of optical pulses generated from a laser of configuration FIG. 1, with a FWHM width of 1.1 picosec.
Figure 3:
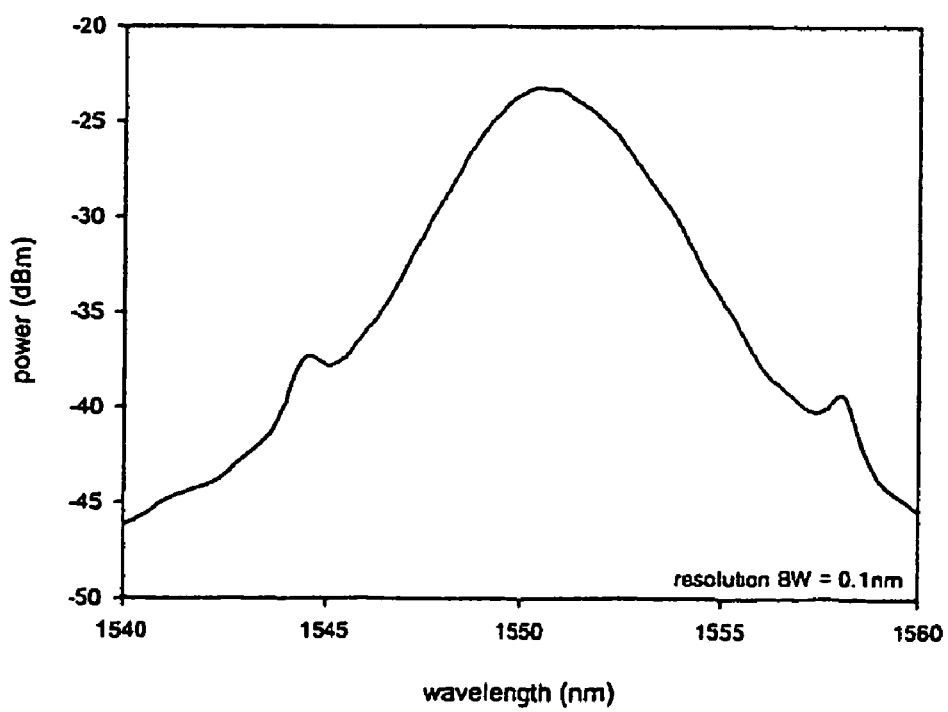
FIG. 3 shows a measured optical spectrum of optical pulses generated from a laser configuration of FIG. 1, with a 3-dB spectral width of 3.7 nm.

The autocorrelation trace of the output mode-locked pulses of the laser of FIG. 1 is shown in FIG. 2, whilst the output spectrum of the laser configuration is shown in FIG. 3. The autocorrelation trace and spectrum are well-fitted by a secant-hyperbolic-squared (sech2) pulse profile, indicating that soliton pulses are generated. Note that the dispersive sidebands in the pulse spectrum (FIG. 3) are a typical signature of a sech 2 soliton laser. The inferred full-width half-maximum (FWHM) width from the autocorrelation trace is estimated to be ~1.1 psec, whilst the 3-dB spectral width of the pulses are measured to be 3.7 nm from the optical spectrum. This corresponds to a time-bandwidth product of 0.52, indicating that there is a chirp in the output pulses (transform limited, unchirped sech 2 pulses have a time-bandwidth product of 0.315).

Further measurements indicate that the chirp is equivalent to the dispersion of ~7 m of SMF. (The output fiber pigtail is estimated to be ~5 m length of SMF). By using low dispersion fiber at the output, it is possible to reduce the chirp in the pulses. Other options include using a different output tapping point or employing external dispersion compensation to yield chirp-free transform limited pulses.

When the carbon nanotube saturable absorber is removed from the laser cavity, it is not possible to mode lock the laser, even when the pump power is increased up to 100 mW. This demonstrates that CNT provides the mechanism required to initiate and sustain mode-locking operation, particularly at very low threshold pump power.

In a thin layer of carbon nanotube, preferably 10 micrometer in thickness or less, and more preferably 1 micrometer or less in thickness, it is believed that there are a limited number of CNT available as absorption centers for the light at the wavelength of which the CNT was designed to provide exciton absorption, therefore the absorption is bleachable (saturable). However, more generally the thickness of a given layer of carbon nanotubes that can be used will depend on the level of absorption that it is desired to obtain in a given application. The concentration or density of CNT in a layer, film or coating employed is preferably the sufficient to give an effective optical absorption between 1% and 99%.

Preferred CNTs are substantially single-walled nanotubes (SWNTs) with diameters selected to provide exciton absorption in the wavelength region at 1550 nm. It is possible, using methods known in the art, to fabricate carbon nanotubes, particularly single-walled carbon nanotubes, of a particular diameter to absorb light of a particular wavelength, or to carbon nanotubes having a diameter distribution selected to cover a broad wavelength region. By controlling the diameter of the carbon nanotube, it is possible to design CNT saturable absorbers which absorb light in the wavelength range from 1.2 micrometer to 2.0 micrometer.

Additionally, apart from saturable exciton absorption, mode-locking can also be assisted by the Kerr-lensing effect in the CNT layer, as CNT also possesses an intensity dependent nonlinear phase-shift (Kerr-type nonlinearity), which will be effective in the setup as shown in FIG. 1 with the out-going lensing system from the CNT layer serving as a shutter (aperture), for Kerr-shutter, or Kerr-lensing operation.

The laser in FIG. 1 at a given focusing position on the CNT layer is always operating in mode-locking regime, even when pumped at high pump power (100 mW). However, when the focusing position on the CNT layer is changed to a different position, with higher absorption, the laser can also be operated in the passive Q-switching regime. This is due to the fact that, the CNT layer on the substrate is not deposited with a constant thickness. Depending on the focusing position on the substrate, different regions of the CNT layer with different thickness can be selected. In the Q-switched region, the beam was actually focused near the edge of the CNT layer, where higher thickness irregularity is expected. The linear transmission loss at this region was measured to be around 0.5 dB higher than that at the mode-locking region. (There is also a possibility that the minute amount of transition metal catalyst impurities such as Co, and Ni, are acting as an assisting agent to produce the Q-switching effect.)

Figure 6:
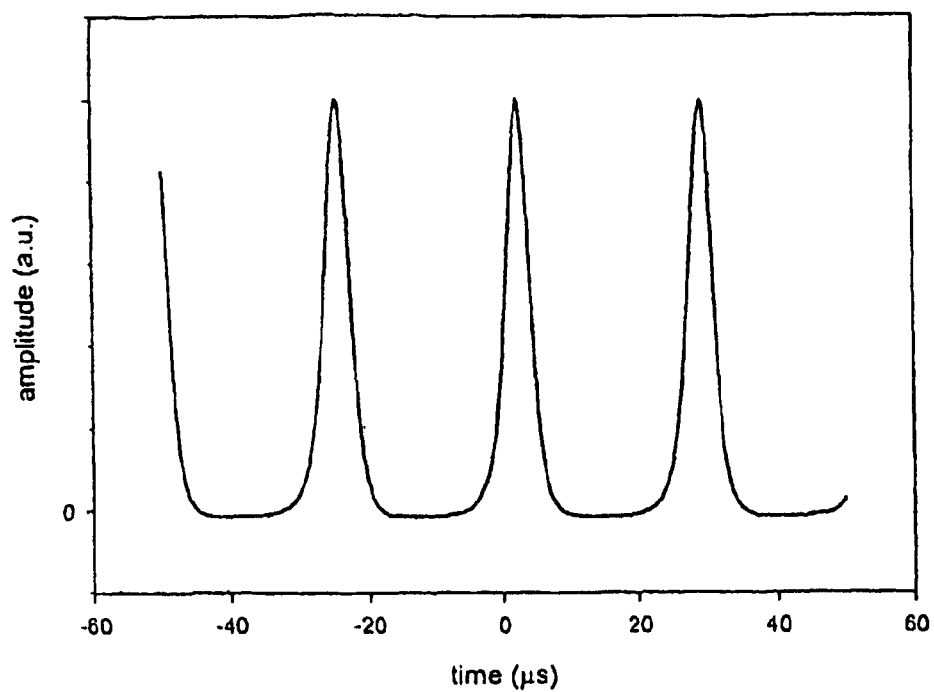
FIG. 6 shows a sampling oscilloscope trace of the Q-switched optical pulses generated from a laser according to FIG. 1 when operated in the Q-switching regime, with a measured FWHM width of 4 µsec and repetition rate of 37.5 kHz.
Figure 7:
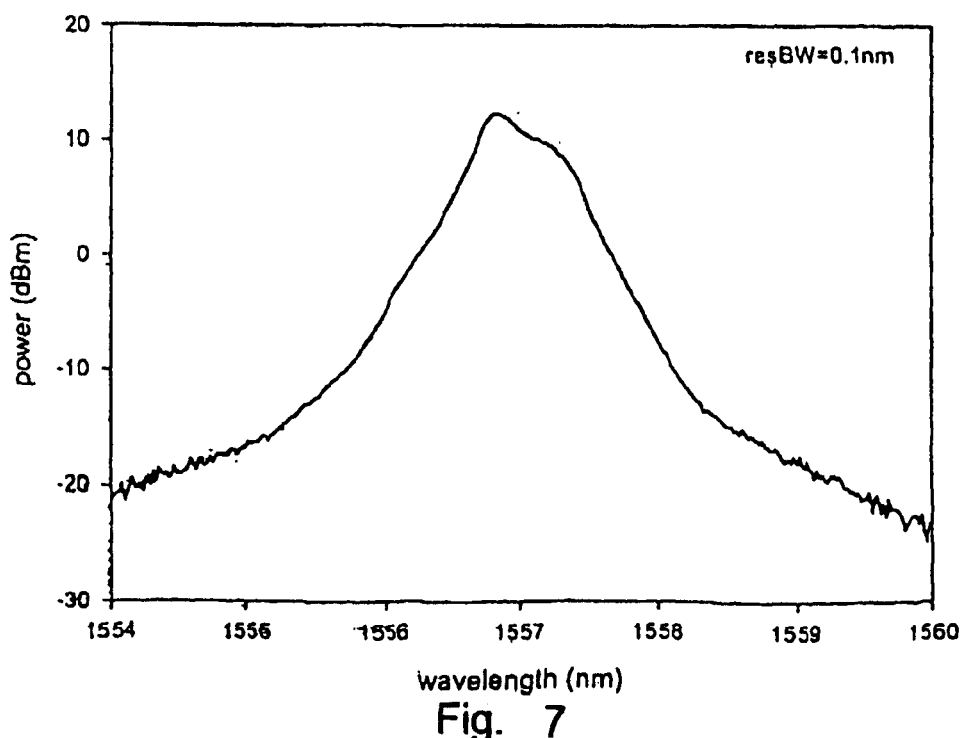
FIG. 7 shows a measured optical spectrum of the Q-switched optical pulses generated from the laser according to FIG. 1 when operated in the Q-switching regime.

FIG. 6 shows the digital sampling scope trace measured with a PIN photodetector of the output Q-switched generated from the laser of FIG. 1, whilst the output spectrum is shown in FIG. 7. The threshold for achieving Q-switching is at a pump power of >75 mW. At lower pump powers, the laser reverts back to mode-locking operation. Depending on the pump power, the repetition rate of the Q-switched pulses can vary slightly, (as a function of pump power from 75 mW to 95 mW), from 34.55 kHz to 37.45 kHz. The corresponding pulse width also varies from 5.32 μsec to 4.04 μsec, and output average power varies from 0.90 dBm to 2.10 dBm.

Figure 8:
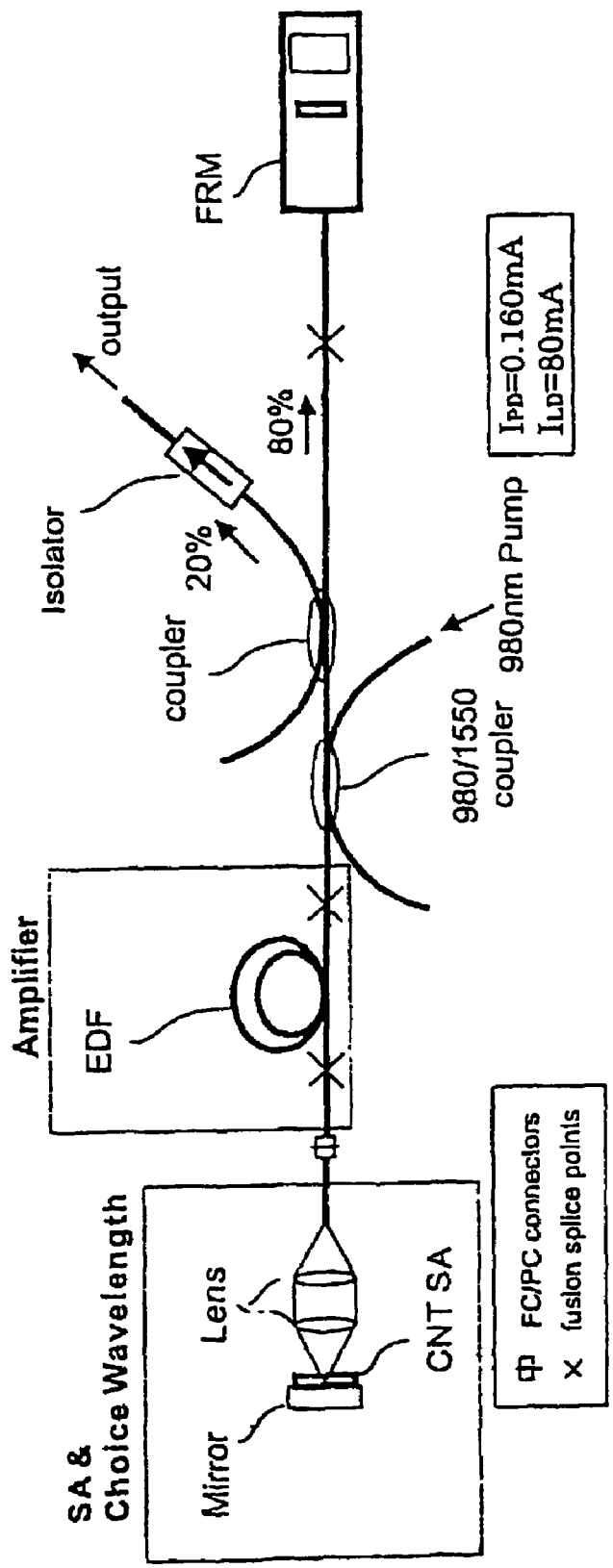
FIG. 8 illustrates the configuration of an optical pulse laser, passively mode locked using a carbon nanotube saturable absorber, in a linear resonator cavity, according to a second exemplary embodiment of the present invention; Again specific exemplary active fiber (amplifier) and pump laser are illustrated; FC and PC connectors and fusion splice points in an exemplary configuration are shown.

Laser power may need to be adjusted as is known in the art to obtain pulse generation. In the case of a typical Erbium-doped fiber mode-locked laser operating at 1550 nm, pumped at 980 nm, the pump power required for mode-locking is usually in the range from 20 mW-200 mW. A higher pump power is usually required to initiate mode-locking [40-80 mW], but once mode-locked, the pump power can be reduced [20-40 mW]. The exemplary laser disclosed herein has a very low self-start power ~20 mW and mode-locking can be maintained at pump power as low as 15 mW.) FIG. 8 shows a second exemplary embodiment of the invention, which is a mode-locked laser in a linear resonator cavity. All the components have their usual functions as described for FIG. 1. A Faraday rotator mirror (FRM) is used for the compensation of polarization variation in the cavity. In this configuration, the CNT is to be used in reflection mode, together with a mirror. The CNT layer is placed on the mirror surface, and two lenses are use to focus the incident beam into a tiny spot on the CNT surface. The light is then reflected back into the linear cavity. The laser of FIG. 8 is simpler to construct compared to that of FIG. 1.

Figure 9:
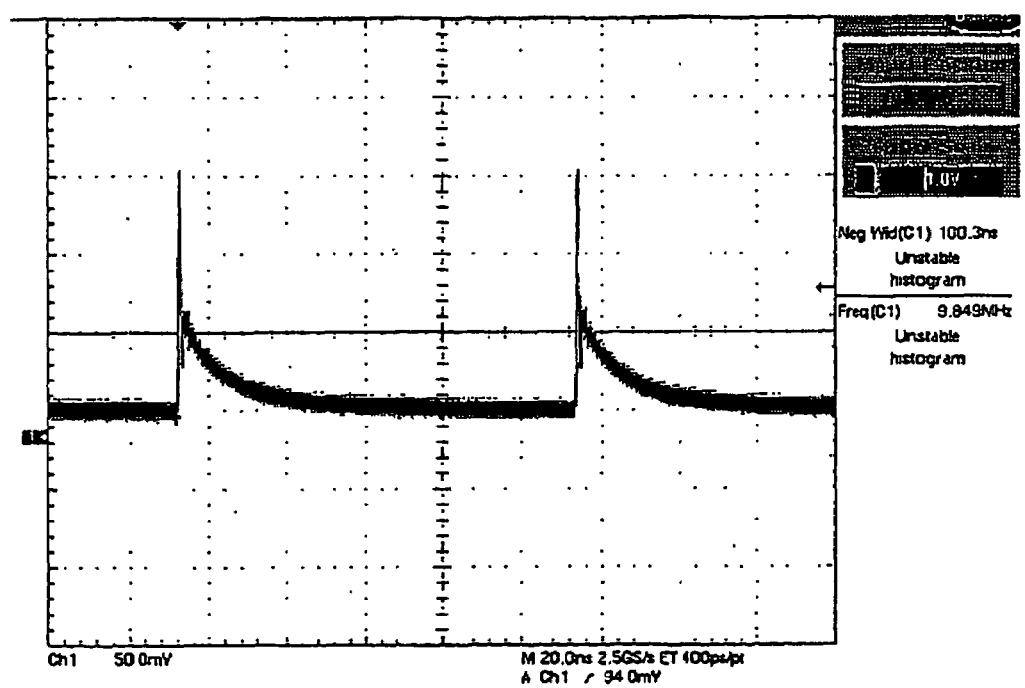
FIG. 9 shows a sampling oscilloscope trace of mode-locked optical pulses generated from a laser according to FIG. 8, showing a fundamental pulsing repetition rate of 9.8 MHz.
Figure 10:
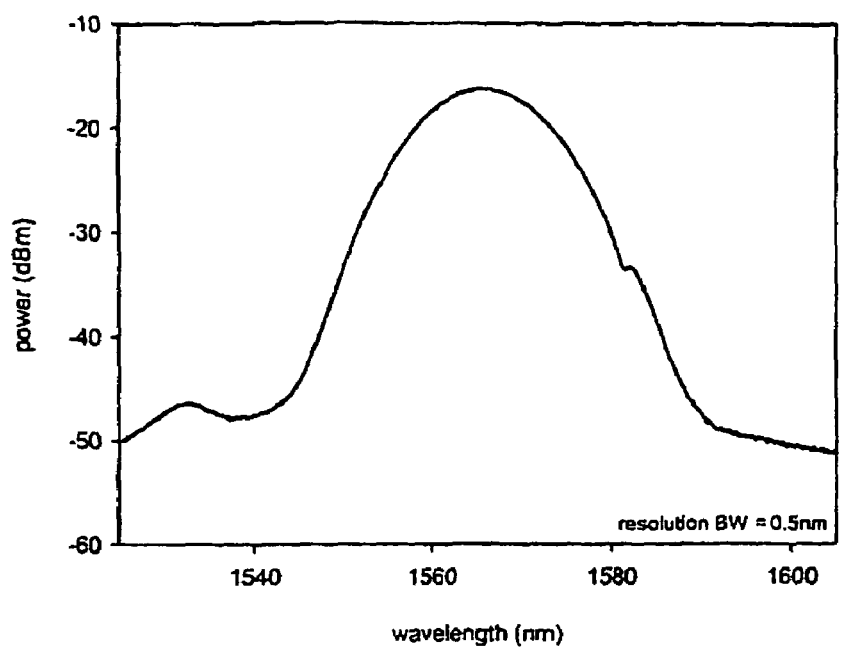
FIG. 10 shows a measured optical spectrum of optical pulses generated from a laser according to FIG. 8, with a 3-dB spectral width of 13.66 nm.
Figure 11:
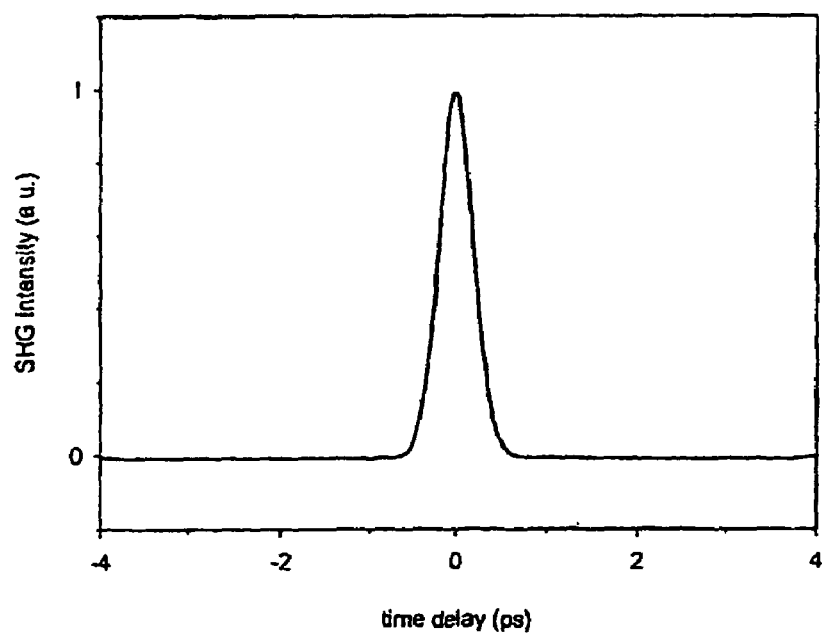
FIG. 11 depicts an autocorrelation trace of optical pulses generated from a laser according to FIG. 8, with an estimated FWHM width of 318 femtosec.
Figure 12A:
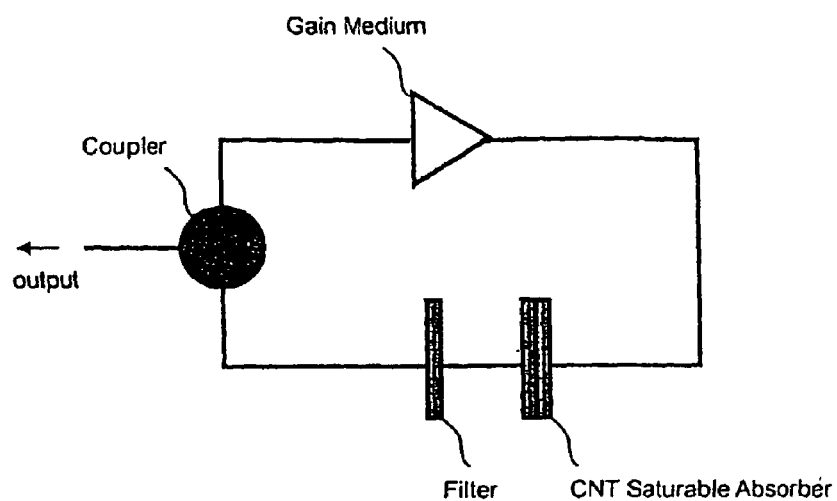
FIGS. 12A-C illustrate ring laser configurations.
Figure 12B:
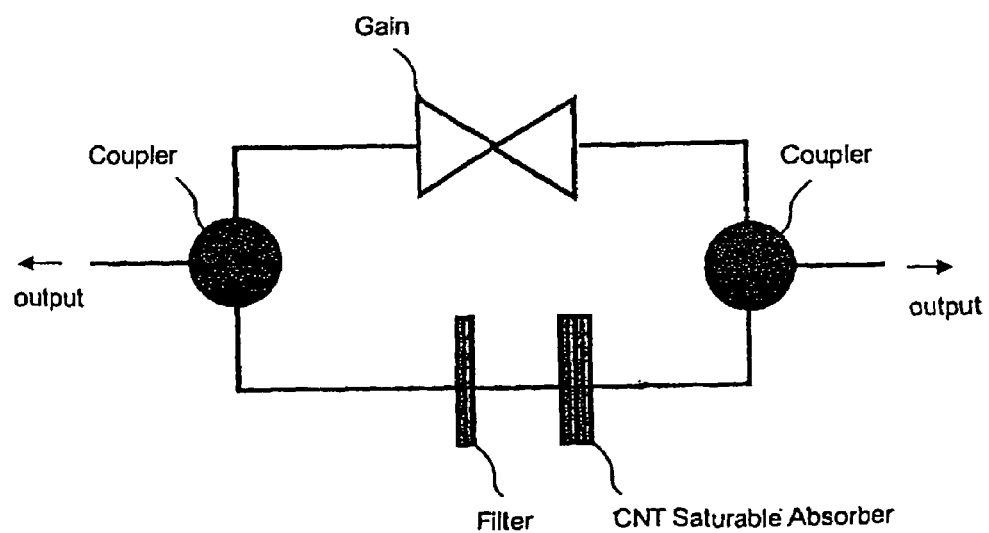
Figure 12C:
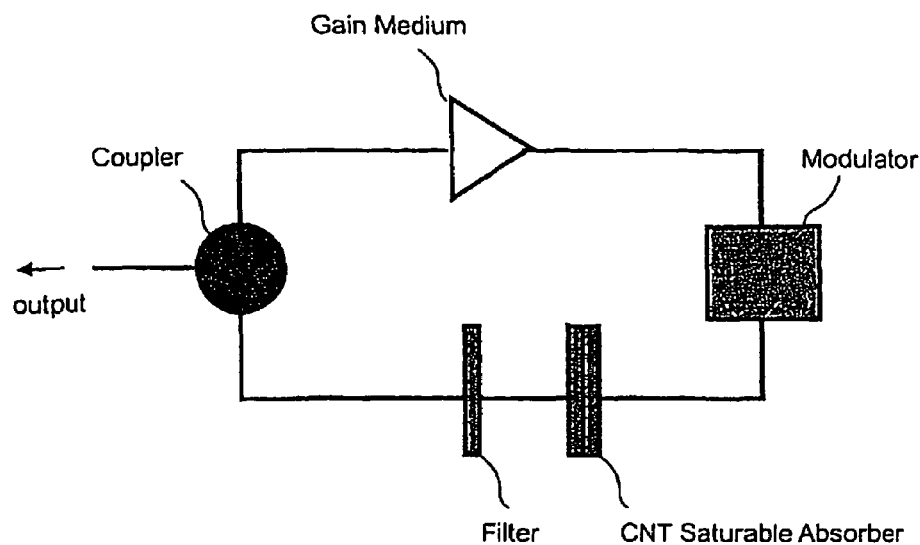
Figure 13A:
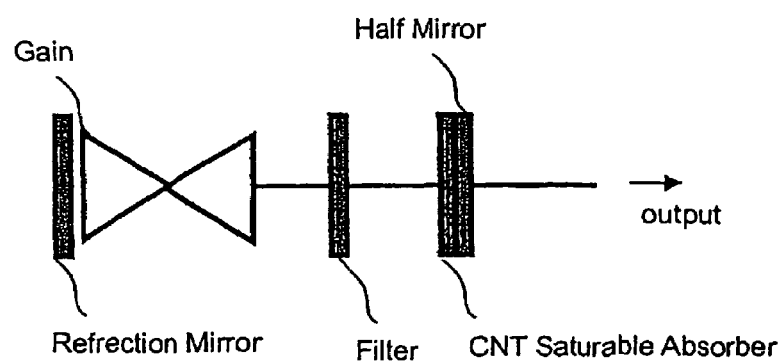
FIGS. 13A-E illustrate exemplary linear laser configurations.
Figure 13B:
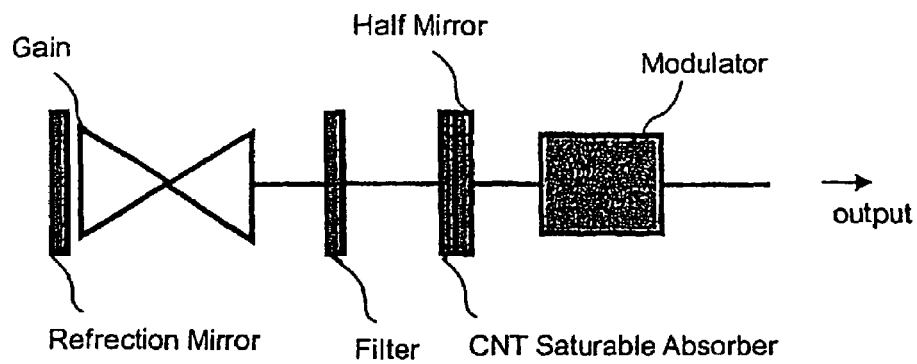
Figure 13C:
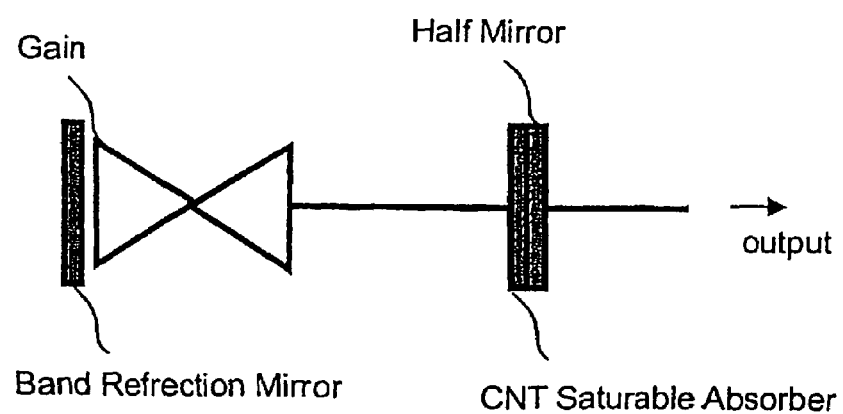
Figure 13D:
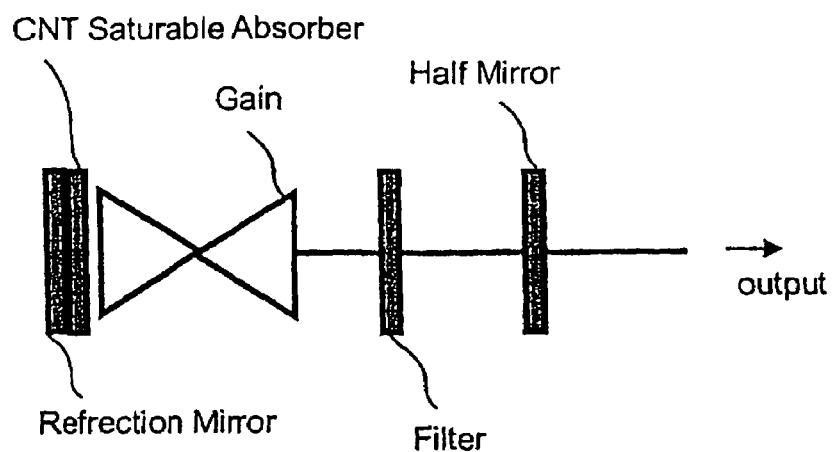
Figure 13E:
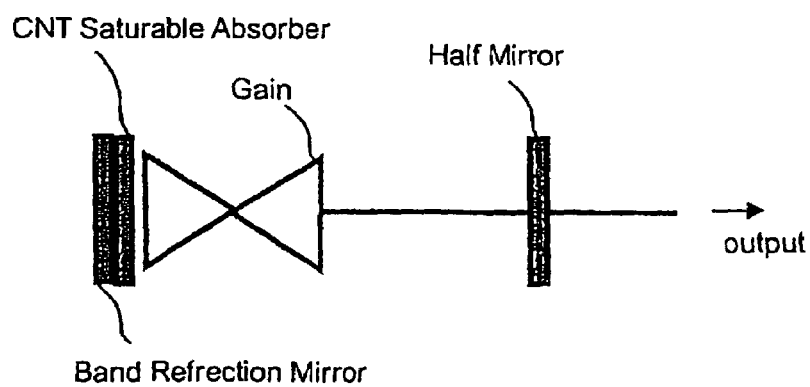
Figure 14A:
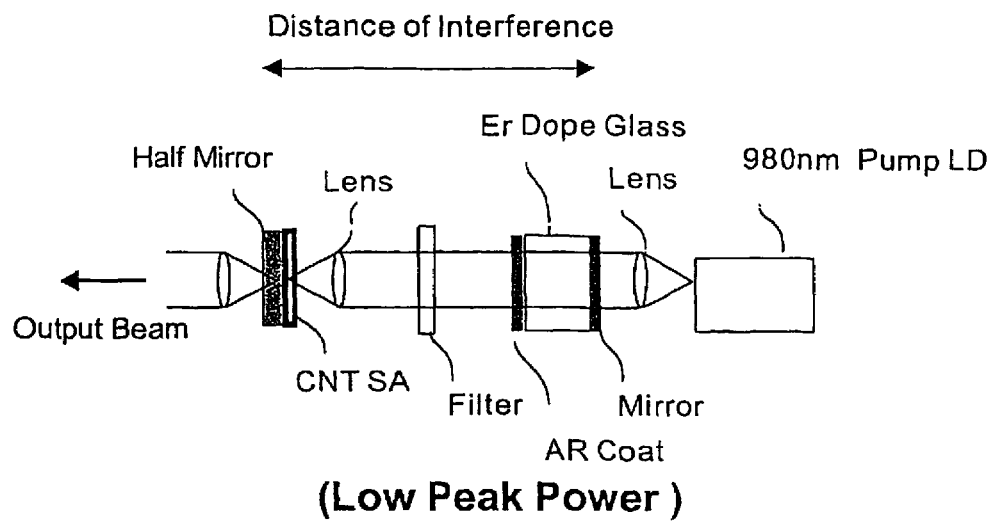
FIGS. 14A-D illustrate additional laser configurations of this invention.
Figure 14B:
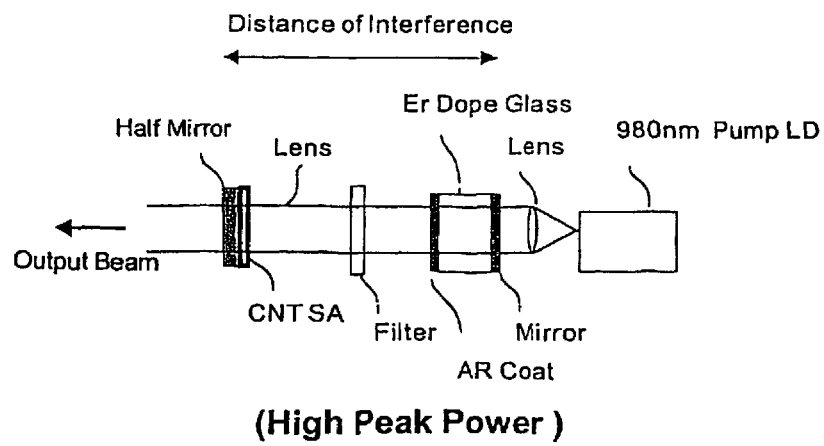
Figure 14C:
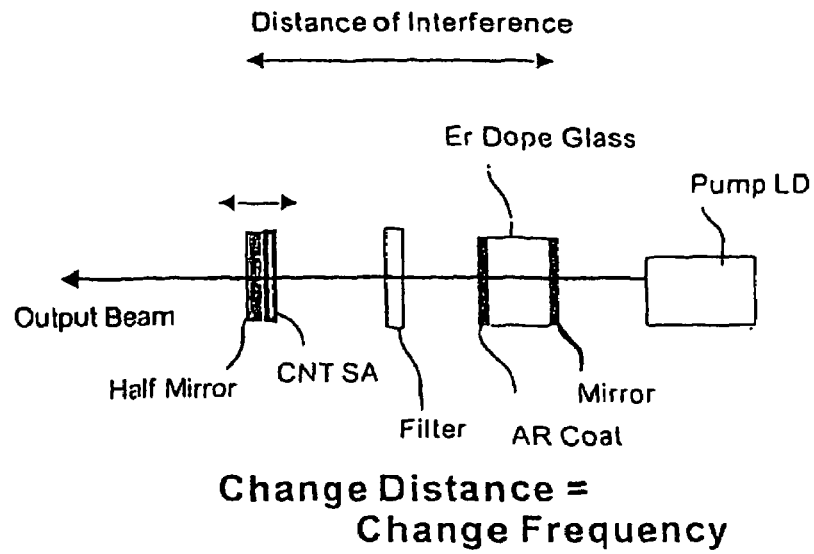
Figure 14D:
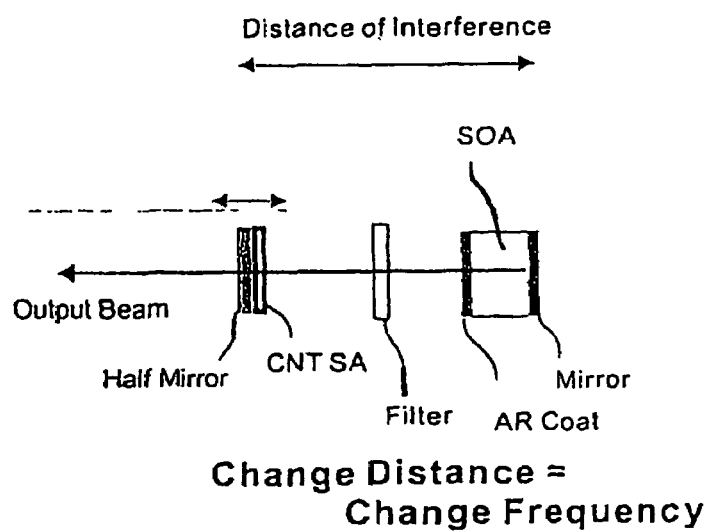
Figure 15A:
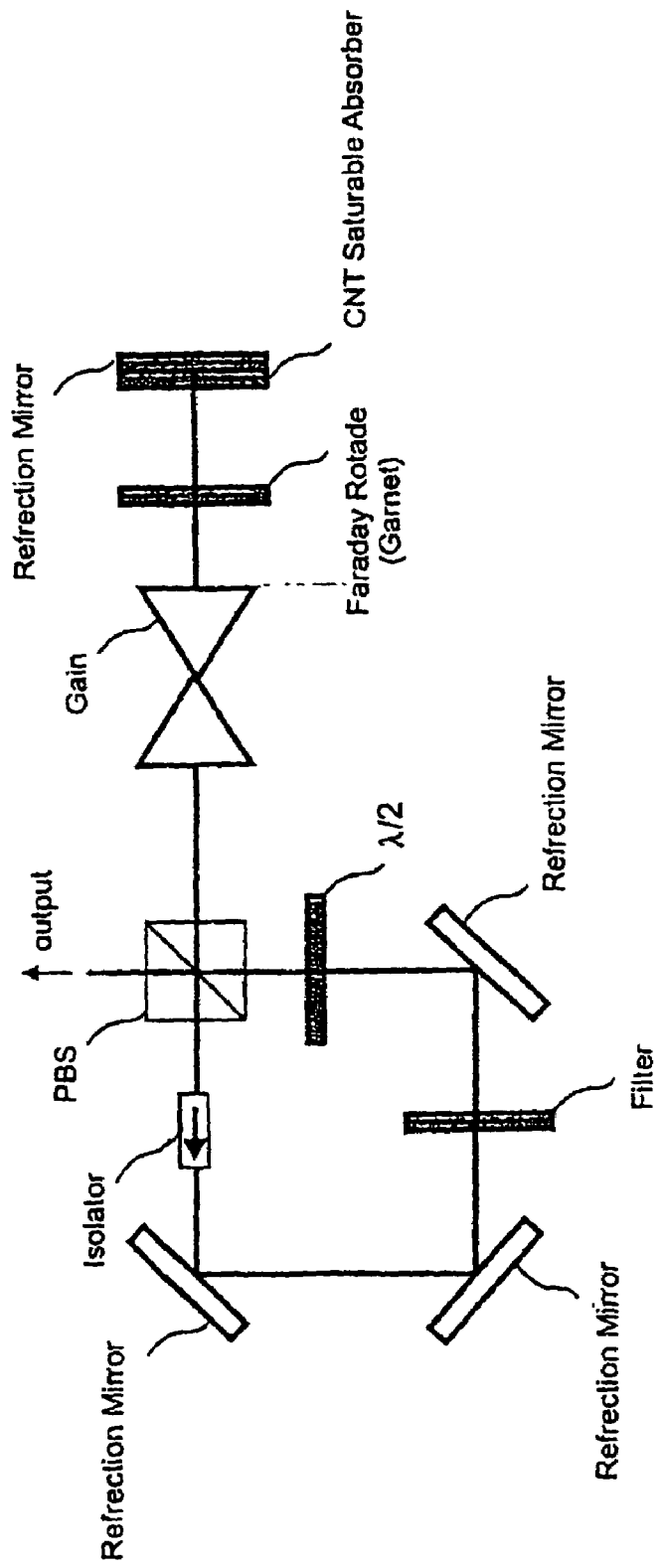
FIGS. 15A-C are additional laser configurations of this invention.
Figure 15B:
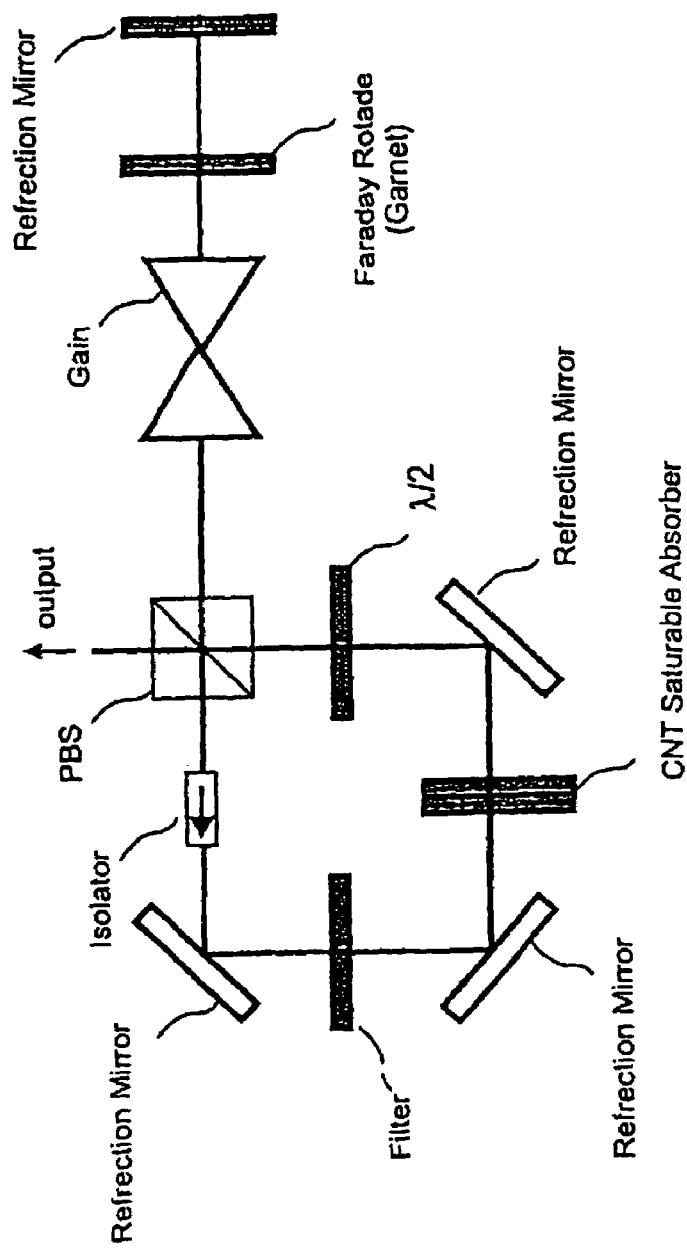
Figure 15C:
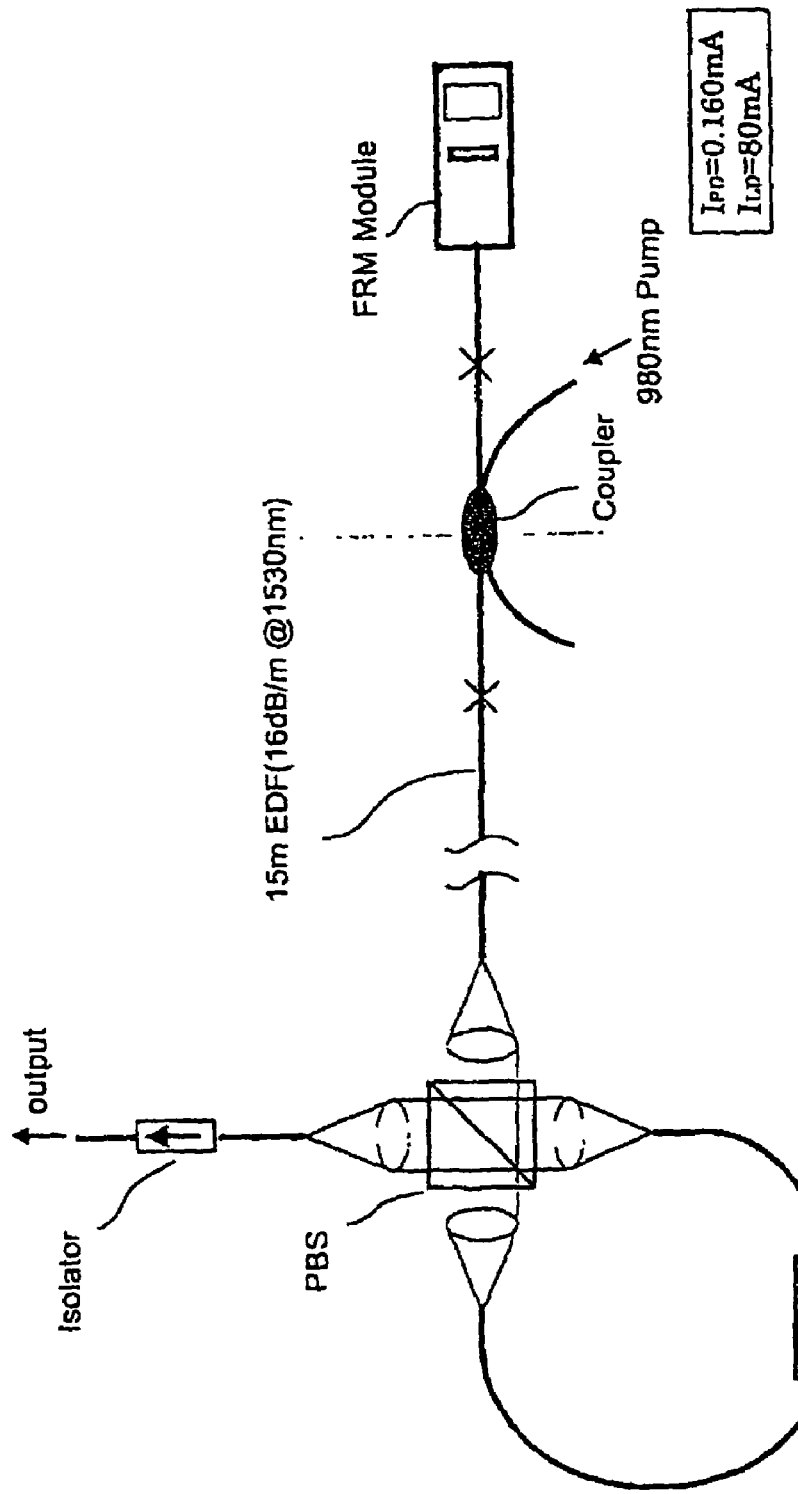
Figure 16A:
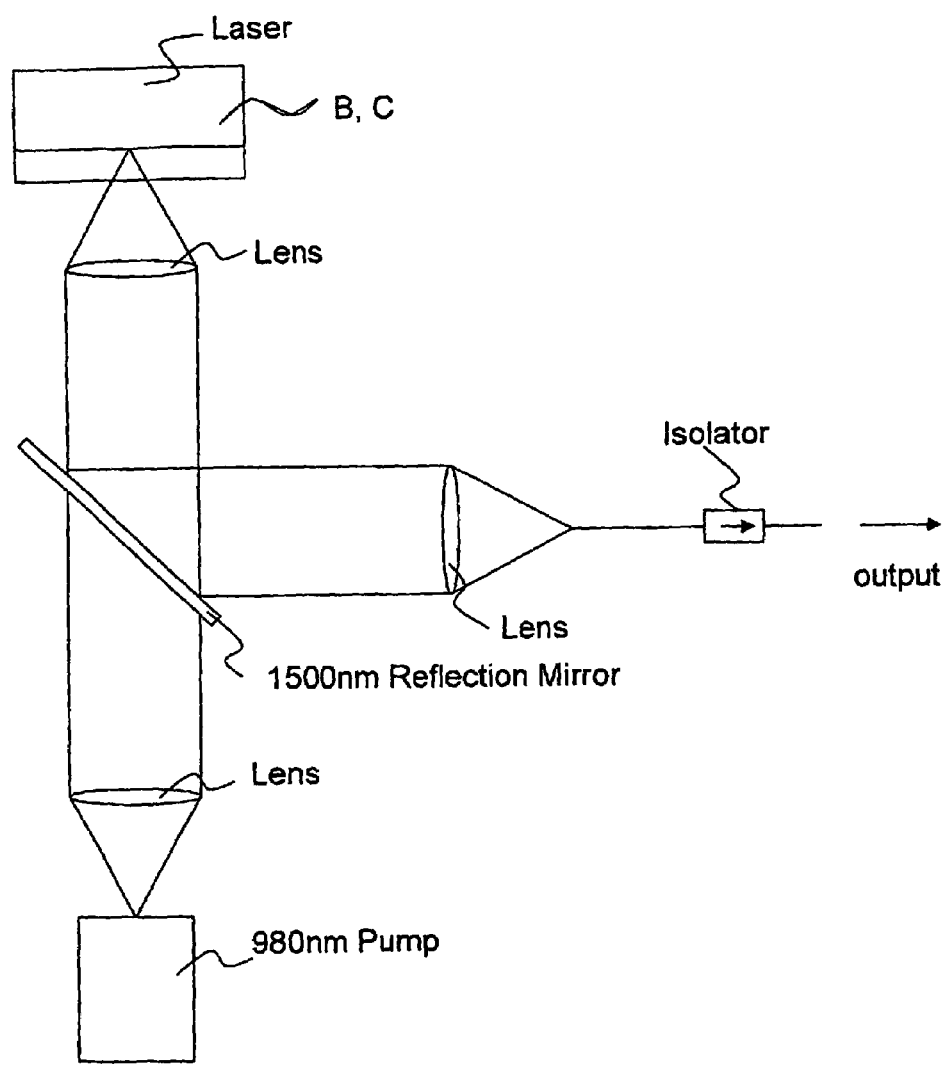
FIG. 16A illustrates a compact configuration for a high repetition rate linear lasers. The configuration is illustrated for high intensity, but low peak power. If the laser lens is removed the laser is low intensity, but high peak power.
Figure 16B:
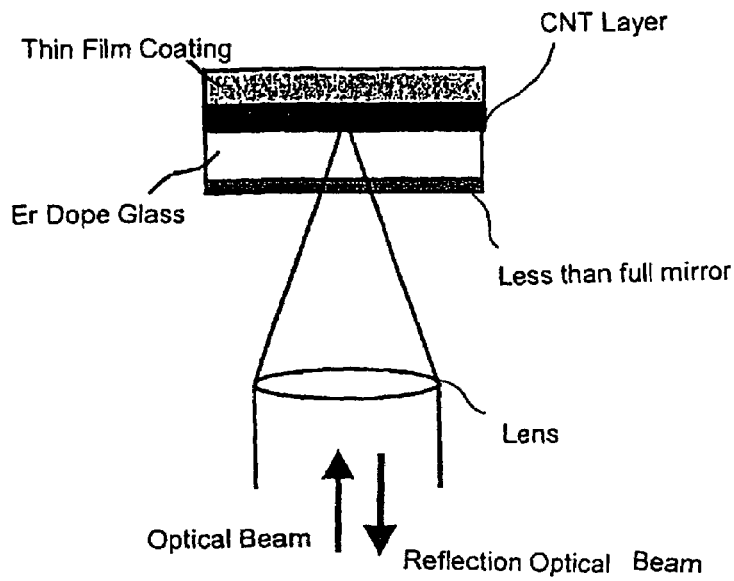
FIG. 16B is an enlargement of the laser of the configuration of FIG. 16A, showing that the lens focuses light into and out of the CNT layer.
Figures 16, 16C, 16D:
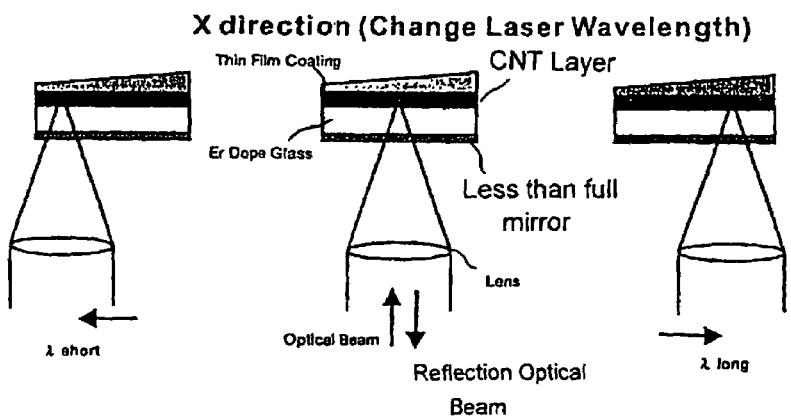

FIG. 9 shows the digital sampling oscilloscope trace of the laser of FIG. 8 measured using a PIN photodetector, and showing laser output pulses operating at the fundamental cavity repetition rate of 9.849 MHz. The output spectrum of the pulses is shown in FIG. 10, with a spectral 3-dB width of 13.66 nm, in a Gaussian-type shape. FIG. 11 shows the autocorrelation trace of the mode-locked pulses with a Gaussian-type inferred FWHM width of 318 femtosec. The time-bandwidth product is calculated to be 0.543, compared to an unchirped transform limited value of 0.441 for Gaussian pulses. The output average power is nearly at 1 mW, when pumped with 25 mW of pump power.

Additional optical devices, device configurations and laser configurations employing carbon nanotubes in non-linear optical devices and/or in saturable absorber devices are illustrated in FIGS. 12A-C, FIGS. 13A-E, FIGS. 14A-D, FIGS. 15A-C, FIGS. 16A-E, FIGS. and 17A-AD. Waveguide configurations are illustrated in FIGS. 18A-L and fiber ferrule configurations (Fabry-Perot configurations) are illustrated in FIGS. 19A-H.

Figure 17C:
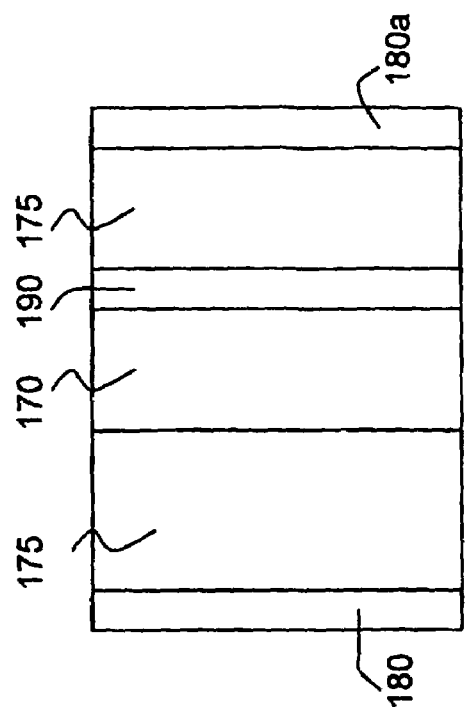
FIGS. 17A-C, J-M, R-T illustrates various mode locking saturable absorber device configurations containing carbon nanotubes including a base carbon nanotube (CNT) unit (FIG. 17R) which is a CNT layer (170) on a substrate face (175). The CNT layer can be prepared by spraying down a layer of carbon nanotubes; by combining CNT with resin or glue to for the layer or by other known deposition methods; and the positioning of the saturable absorber device at the focal point of one or more lenses.
Figure 17B:
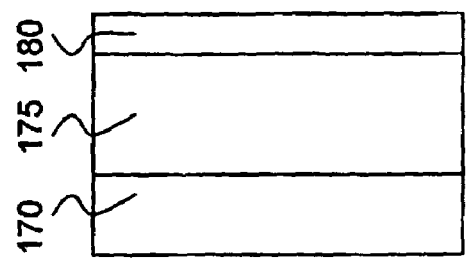
Figure 17A:
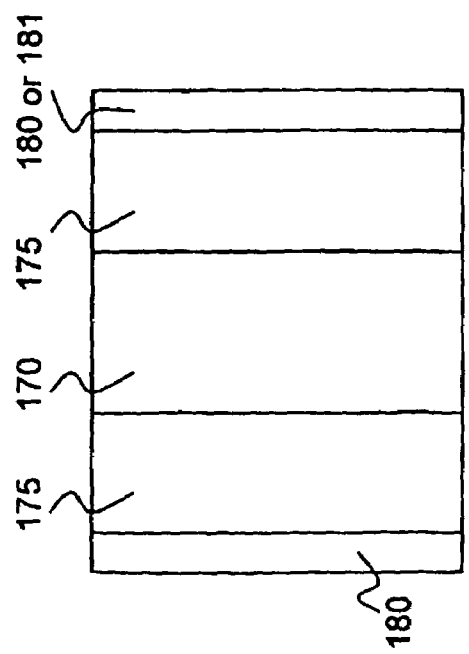

A device with non-linear optical properties and/or saturable absorber properties, particularly useful for mode-locking can be based on a layer of carbon nanotubes, e.g. a SWNT film or a combination of SWNT and MWNT film coated or applied on a substrate. The substrate can be transparent or opaque or contain portions that are transparent and portions that are opaque. The other side of the substrate can be coated with thin-film layers to generate an AR (anti-reflection) coating, a bandpass filter, or a half-mirror. FIG. 17A-Z illustrate applications of devices with non-linear optical properties and/or saturable absorber properties.

Figure 17D:
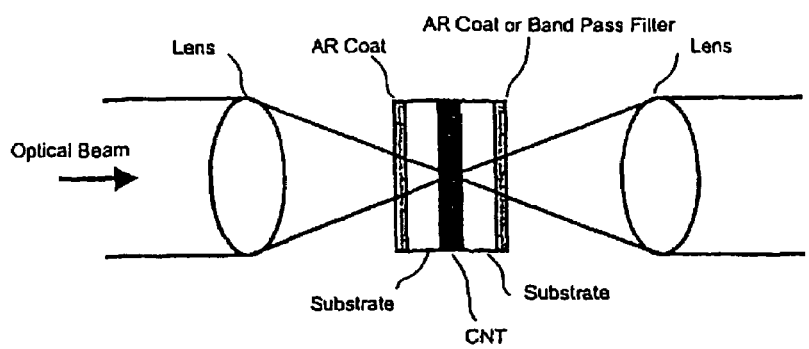
FIGS. 17D and E are transmission configurations for coupling into the saturable absorber mode-locking device with the saturable absorber layer positioned at the focal point of a lens (low peak power configurations). The optical beam can originate and be collected into a fiber.
Figure 17E:
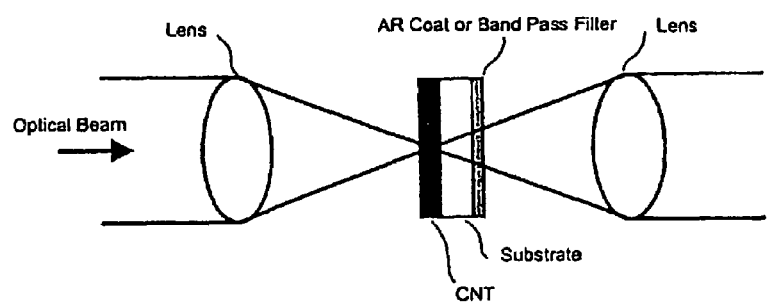
FIG. 17F is a reflection configuration.
FIGS. 17G-I are analogous to configurations of FIG. 17D-F in which light is incident on the CNT layer in a parallel manner (for high peak power).
FIGS. 17J-M illustrate more complex saturabsorber device configurations with the saturable absorber sandwiched in a Fabry-Perot structure.
FIGS. 17N-Q illustrate transmission and reflection mode configurations employing the device configurations of FIGS. 17J-M with light focused on the CNT layer (low peak power configurations). These configurations can be implemented as illustrated in FIGS. 17G-I for high peak power.
FIGS. 17R-T illustrate additional saturable absorber mode locker configurations.
Figure 17F:
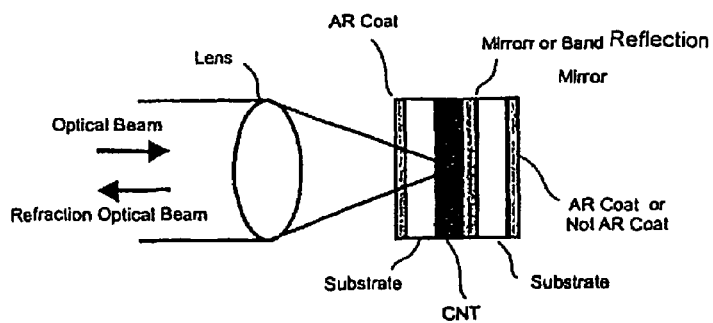

FIGS. 17D-F show one pass/non-cavity structures having the functionality of a bandpass filter, mirror, bandpass filter and mirror, and plane saturable absorber. In these configurations low peak power is assumed, so that the light is converged using lenses to high power density in the carbon nanotube material.

Figure 17G:
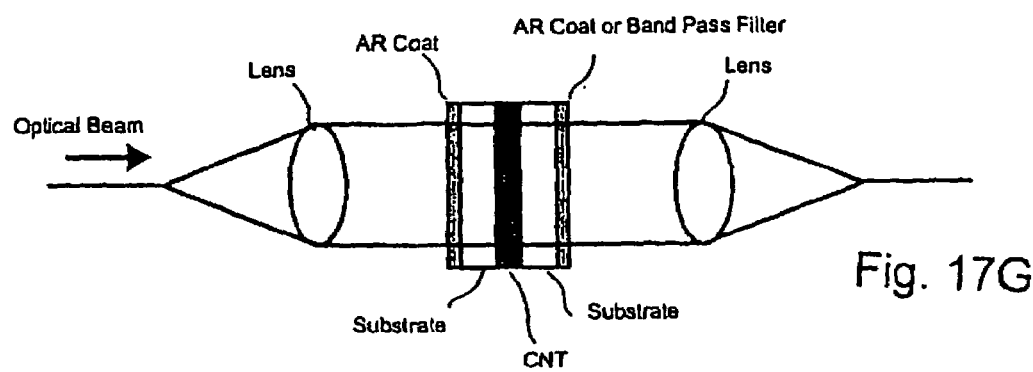
Figure 17H:
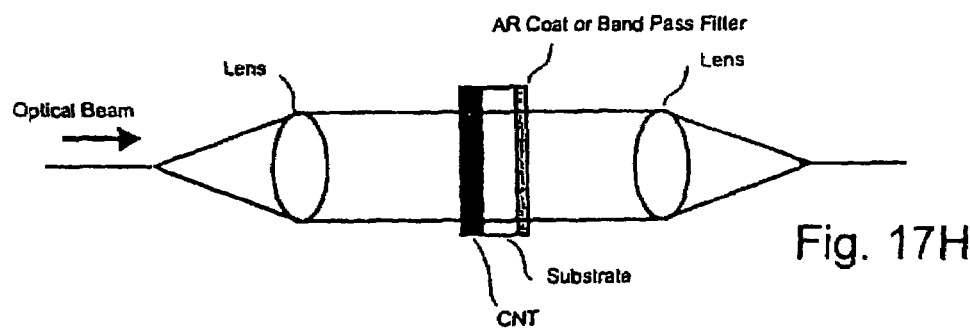
Figure 17I:
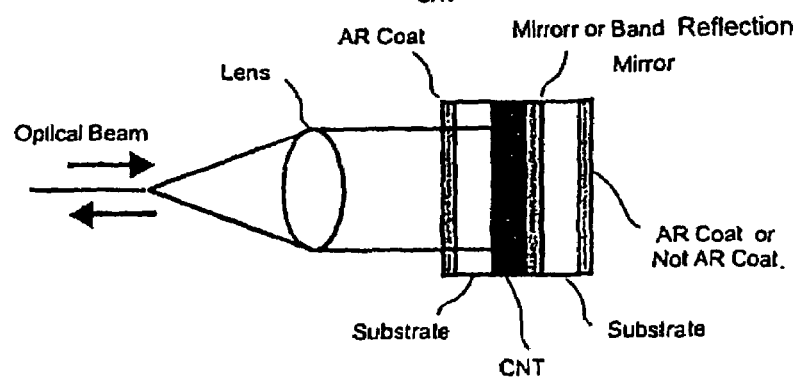
Figure 17J:
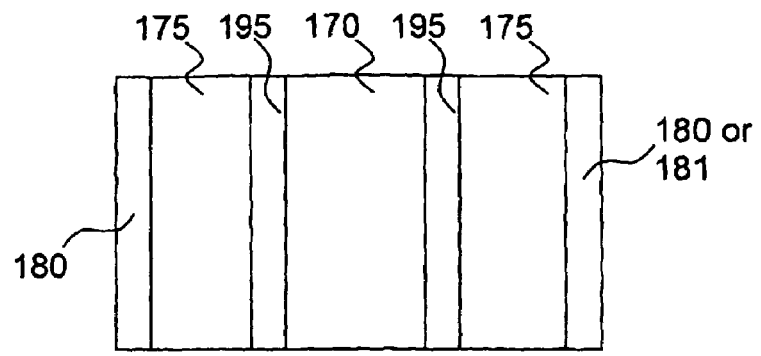
Figures 17K, 17L:
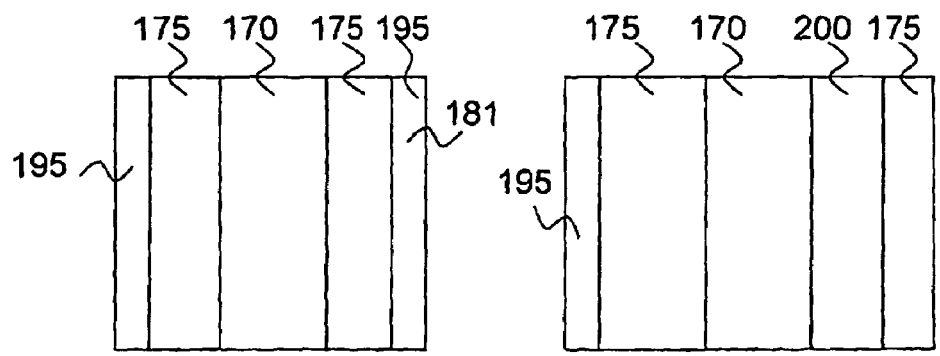
Figure 17M:
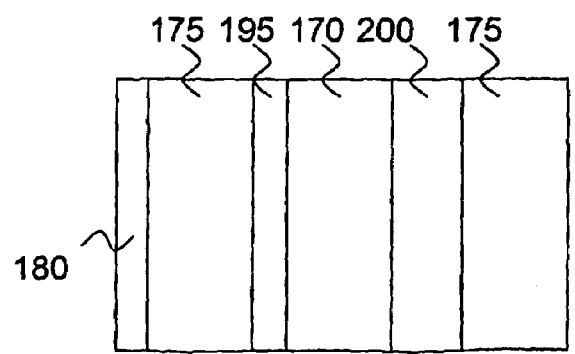
Figure 17N:
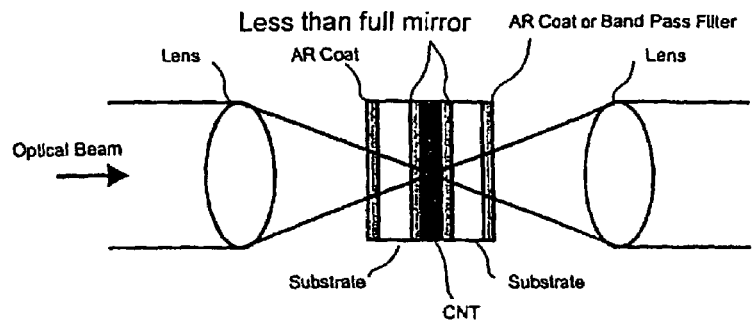
Figure 17O:
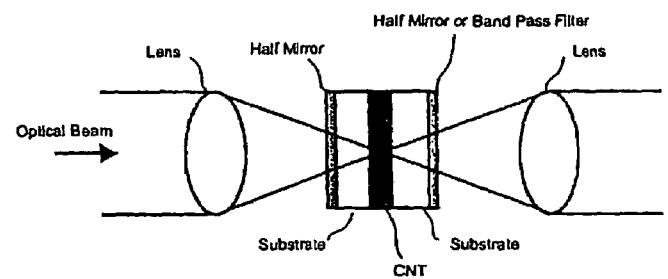
Figure 17P:
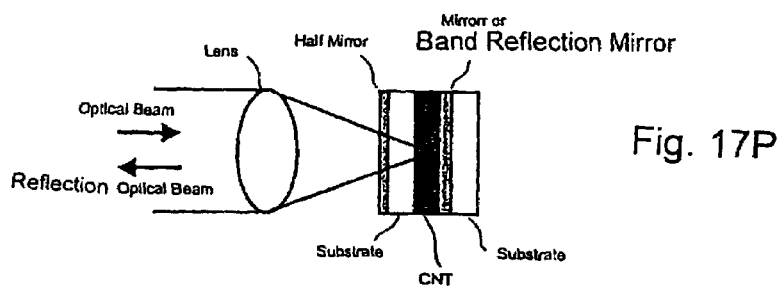
Figure 17Q:
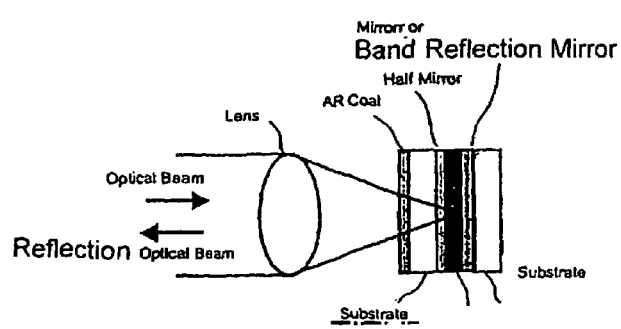
Figure 17R:
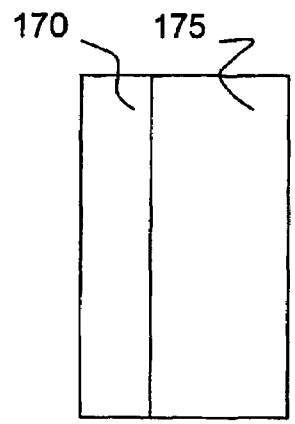

FIGS. 17G-I show one pass/non-cavity structures having the functionality of bandpass filter, mirror, bandpass filter and mirror, and plane saturable absorber. In these configurations high peak power is assumed, so that the light does not need to be converged or is kept parallel (as in the output of a collimator lens). No extra lens for convergence is needed.

FIGS. 17N-Q show a multiple pass cavity (Fabry Perot type) resonant structure where the carbon nanotube material is placed inside a cavity between two reflective mirrors. In these configuration low peak power is assumed, so that the light is converged using lenses to high power density (small spot size) in the carbon nanotube layer in the cavity. These configuration can be used to lower the saturable threshold power, and enhance the saturable absorber property of the device. Analogous multiple pass cavity (Fabry Perot type) resonant structures where the carbon nanotube material is placed inside a cavity between two reflective mirrors can be configured as illustrated in FIGS. 17G-I for high peak power where the light does not need to be converged or is kept parallel (as in the output of a collimator lens). These configurations can be used to lower the saturable threshold power, and enhance the saturable absorber property of the device. Dual lens configurations can be used to focus the light to a small spot size in the carbon nanotube layer when power is low.

Figure 17S:
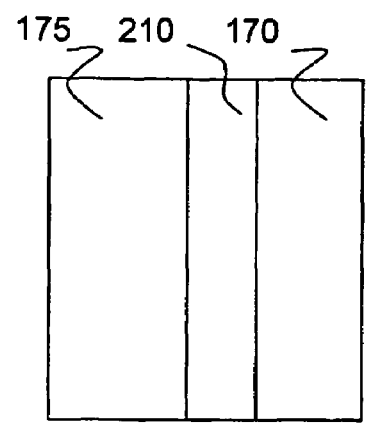
Figure 17T:
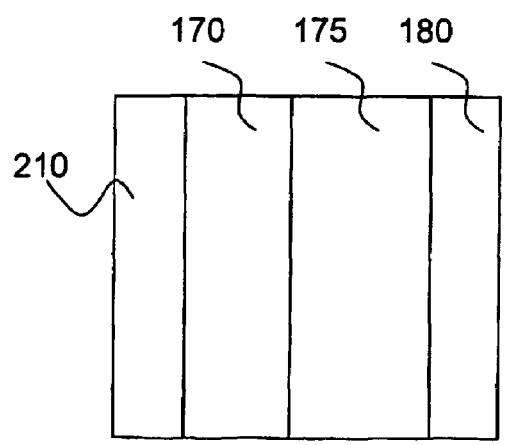

FIGS. 17S and T illustrate Saturable absorber mirrors (SAMs) employing CNT layers. Configurations employing these structures are illustrated in FIGS. 17U-Z.

FIGS. 17AA-17AD illustrates Grating-type configurations of saturable absorbers. These configurations can be implemented in low peak power configurations or in high peak power configurations (not specifically illustrated).

The device configurations illustrated in the figures which combine saturable absorber layers with gratings and/or filters can be employed in laser configurations or for general use in optical applications/

Figure 18A:
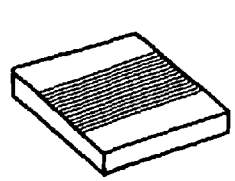
FIGS. 18A-B illustrates waveguide structures in which CNT can be provided as layers or elements.
Figure 18B:
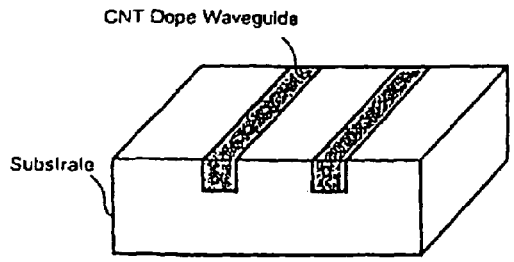
Figure 18C:
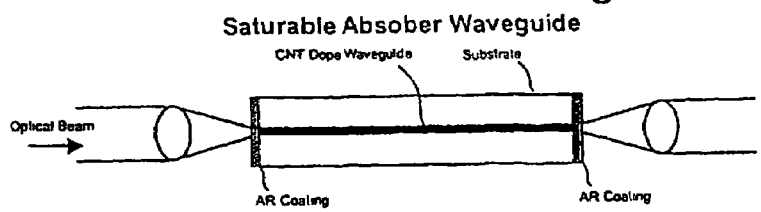
FIGS. 18C-F illustrate device applications of waveguides having CNT layers or doping.
Figure 18D:
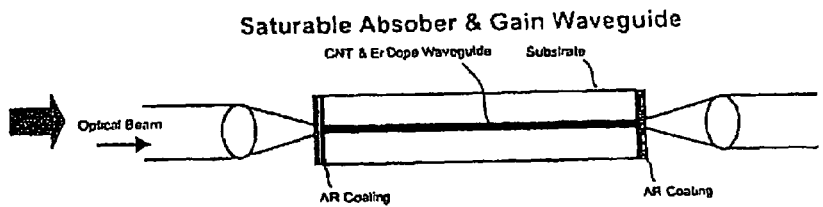
Figure 18E:
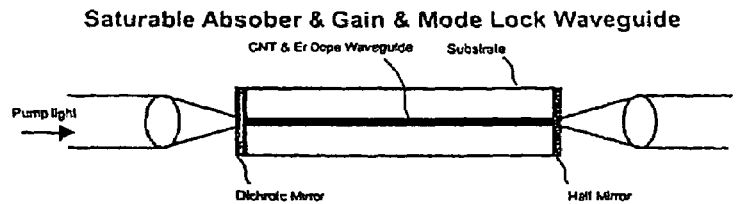

FIGS. 18A-L illustrate waveguides and their applications. FIG. 18C-E show the coupling of light into and out of the waveguide via a lens structure. Configuration of FIG. 18C functions only as a saturable absorber, but configuration the configuration of FIG. 18D provides both gain and saturable absorption. Configuration (FIG. 18E) functions as a laser cavity using pumping through a dichroic mirror.

Figure 18F:
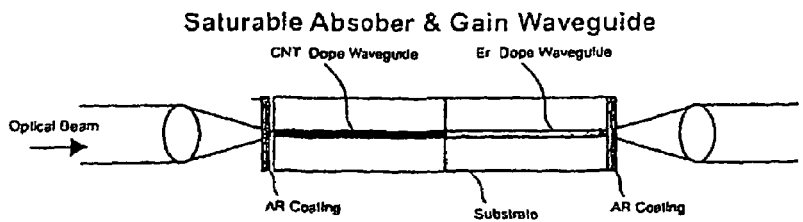
Figure 18G:
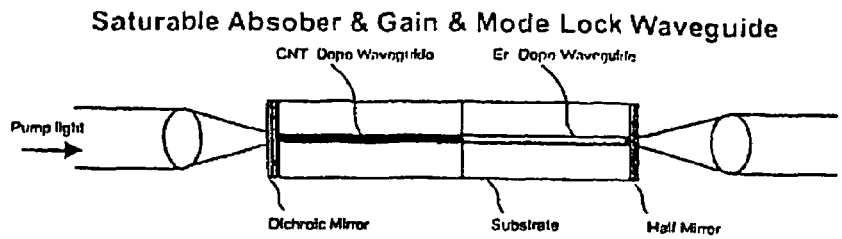
FIG. 18G is a saturable absorber, gain and mode lock waveguide in which the device is provided with mirrors as illustrated. The waveguides of FIGS. 18C-G are optically coupled with lenses.

FIGS. 18F and G also show the coupling of light into the waveguide via a lens structure. Configuration (FIG. 18F) provides both gain and saturable absorption with the gain part separate from the saturable part. Configuration (FIG. 18G) functions as a laser cavity using pumping through a dichroic mirror with the gain part separate from the saturable absorber part.

Figure 18H:
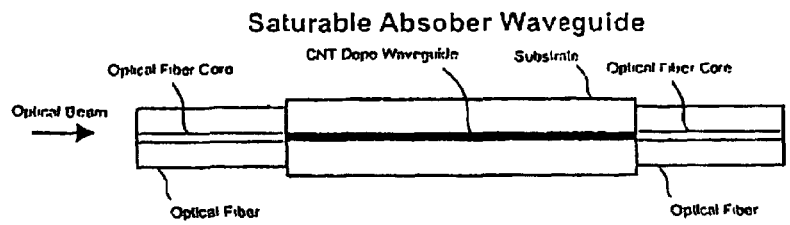
FIGS. 18H-L are waveguide configurations analogous to those of FIGS. 18C-G in which the waveguide is optically coupled into fiber.
Figure 18I:
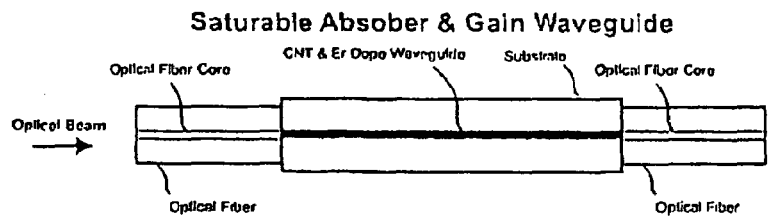
Figure 18J:
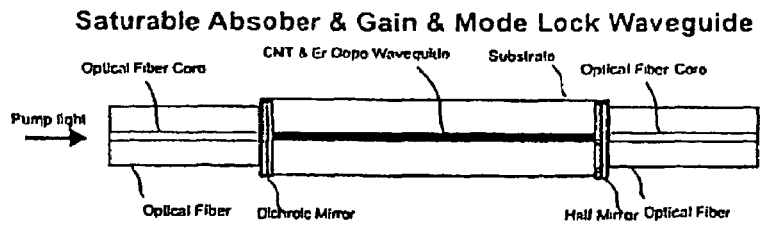

FIG. 18H-J show the coupling of light into the waveguide directly via an optical fiber. Configuration (FIG. 18H) functions only as a saturable absorber. Configuration (FIG. 18I) provides both gain and saturable absorption. Configuration (FIG. 18J) functions as a laser cavity using pumping through a dichroic mirror.

Figure 18K:
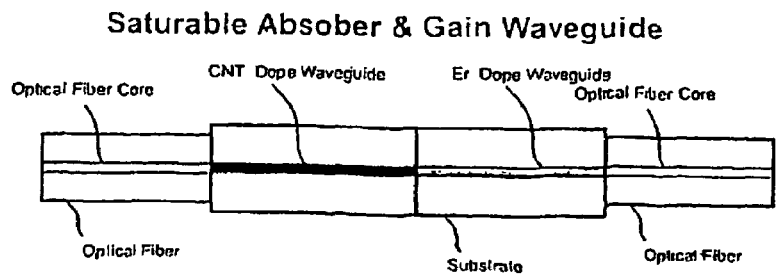
Figure 18L:
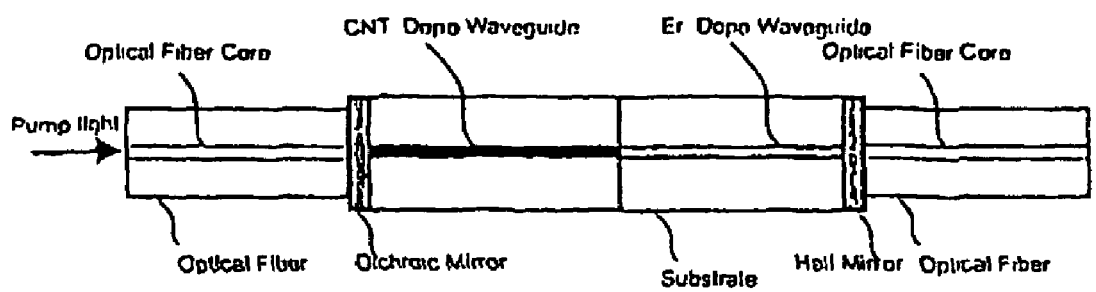

FIGS. 18K-L show the coupling of light into the waveguide via a lens structure. Configuration (FIG. 18K) provides both gain and saturable absorption with the gain part separate from the saturable absorber part. Configuration (FIG. 18L) functions as a laser cavity using pumping through a dichroic mirror with the gain part separate from the saturable absorber part.

Figure 19A:
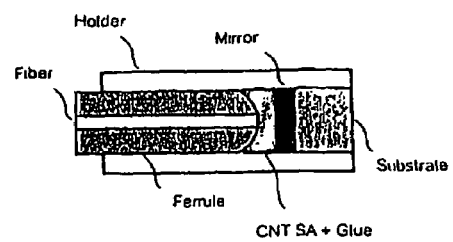
FIGS. 19A-B illustrate fiber ferrule devices containing a CNT layer.
Figure 19B:
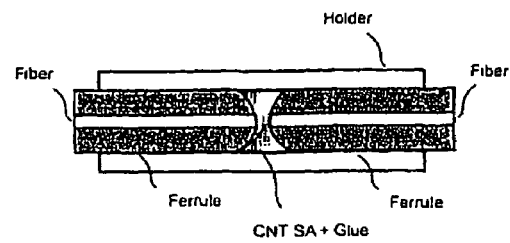
Figure 19C:
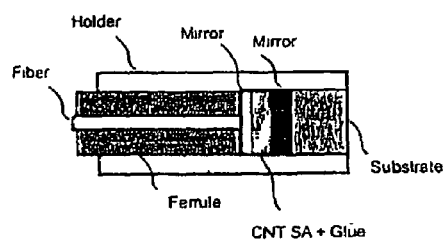
FIGS. 19C-D illustrate fiber ferrule etalon devices containing CNT.
Figure 19D:
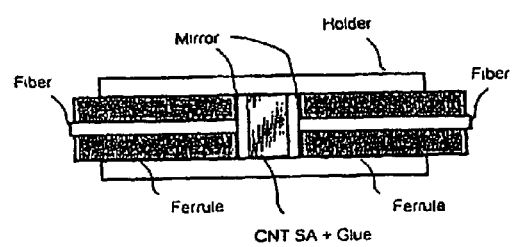
Figure 19E:
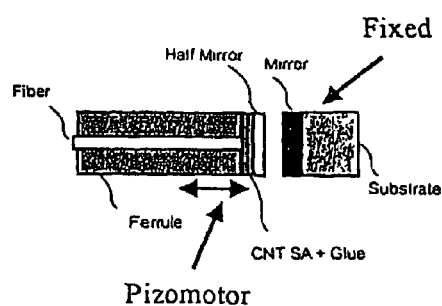
FIGS. 19E-F illustrate fiber ferrule etalon devices wherein the cavity length is adjustable wherein the distance between the mirrors can be adjusted by moving at least one of the filer ferrules (e.g., with a piezomotor).
Figure 19F:
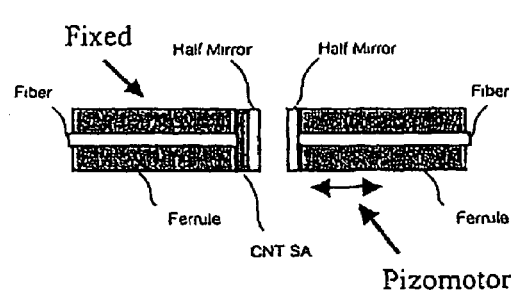

CNT material can be either sprayed/deposited/and/or doped in a waveguide structure. The waveguide can be a fiber as shown in FIGS. 19A or B. Various optical device configurations can be made using this CNT waveguide structure, including those of FIGS. 19A-H. FIG. 19A shows CNT material in the form of a SAM butted directly to fiber and enclosed in a ferrule. This structure functions as a reflection type of saturable absorber. FIG. 19B shows CNT material placed between two pieces of fiber enclosed in a ferrule. This structure functions as a transmission type of saturable absorber. FIG. 19C shows a fiber ferrule etalon filter in reflection mode with CNT material placed in the cavity. FIG. 19D shows a fiber ferrule etalon filter in transmission mode with CNT material placed in the cavity. FIG. 19E shows an adjustable fiber ferrule etalon filter in reflection mode with CNT material placed on the face of one of the mirrors outside the cavity. FIG. 19F shows an adjustable fiber ferrule etalon filter in transmission mode with CNT material placed on the face of one of the mirrors outside the cavity.

Figure 19G:
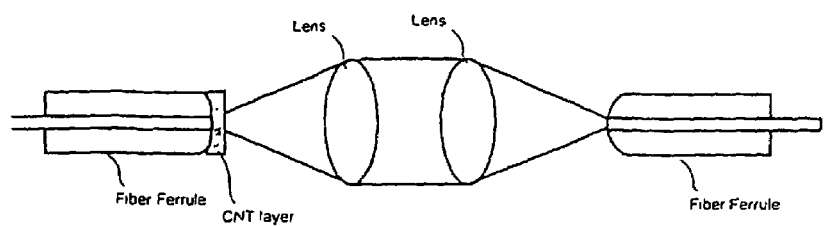
FIGS. 19G and H illustrates another fiber ferrule device with fixed distance between the fiber ferrule ends. The device employs free-space coupling via a lens configuration.
Figure 19H:
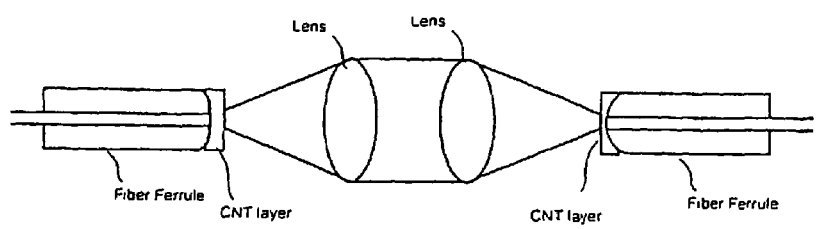

FIGS. 19G-H illustrate fixed fiber ferrule devices that can function as a saturable absorber or as a mode locker. In FIG. 19G a CNT layer is provided at one fiber end and the fiber having this CNT layer is free-space coupled to a second fiber end through a lens configuration. In FIG. 19H two fiber ends are provided with a CNT layer and the two fiber ends are free-space coupled using a lens configuration. These device configurations can for example be employed as saturable absorbers in an optical fiber configuration. These device configurations can be employed, in particular, as a mode locker in a pulsed fiber laser system.

Figures 20A, 20B:
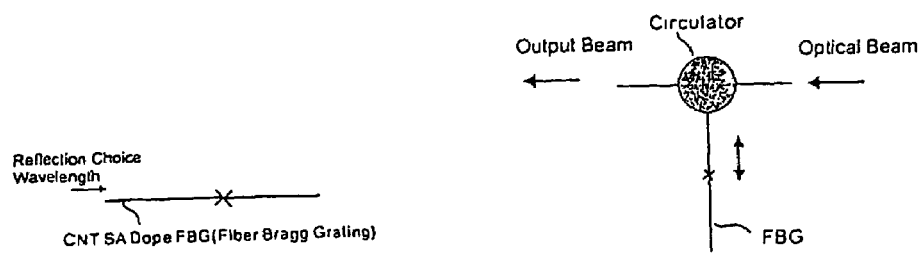
FIGS. 20A-B illustrated a FBG doped with CNT (FIG. 20A) for use in combination with a circulator as a bandpass filter and saturable absorber (FIG. 20B)

CNT material can be either sprayed/deposited/and/or doped in a waveguide structure. The waveguide can be an FBG (fiber bragg grating) as shown in FIG. 20A. Various structures can be made using the CNT FBG (Fiber Bragg Grating) base unit. FIG. 20B shows this FBG used in combination with a circulator.

The saturable absorber elements and devices, mode locking elements and devices the laser configurations and the waveguide and FBG configurations illustrated in the figures herein can be readily implemented in view of the descriptions herein and what is know in the art about combining and generating optical elements as illustrated therein. The CNT saturable absorber or non-linear optical material can be provided in a layer wherein the amount of CNT present is sufficient to observe a saturable absorption or non-linear optical effect. The type of CNT (e.g., the diameter of the carbon nanotube) can be selected to obtain an absorption at a desired wavelength or wavelength range. The amount of CNT present in the layer can be adjusted to obtain a desired optical response.

CNT of this invention can be used as non-linear optical material and/or as a saturable absorber in a microlaser configuration, such as those described in U.S. Pat. Nos. 5,502,737; 6,023,479; or 5,844,932.

In general SWNT fabricated by different methods (HiPco, laser ablation and alcohol CCVD, for example) and applied to substrates by different methods (spraying or deposition) as well as applied to different substrates and employed in different substrate configurations are useful for laser mode locking. SWNT samples and SWNT layers fabricated by different methods can provide samples with different operating wavelengths. In a given MINT, absorption level can be controlled by CNT (or more specifically SWNT or MWNT) concentration (in the layer, i.e., CNT/unit volume of layer material) and by layer thickness. Further, my mixing different, kinds of SWNTs (e.g., SWNTs of different diameters) into a layer or by employing multiple layers (each layer, for example, containing a different SWNT, e.g., different in diameter), MINT elements or devices having different operating wavelength ranges can be generated. It is also possible to generate MINT elements or devices which exhibit broader or narrower operating wavelength ranges, particularly having ranges between about 800 nm to 2000 nm or subranges thereof, using such CNT and layer combinations. It is further possible to generate MINT elements or devices having a broad operating range covering from about 800 nm to about 2000 nm using such CNT and layer combinations.

The invention is further exemplified and illustrated in the following examples.

THE EXAMPLES

Example 1

Preparation of Carbon Nanotubes (CNT) for Use as Non-Linear Optical and/or Saturable Absorber Materials CNT can be synthesized by any means such as HiPCo, CVD, laser-oven /ablation and the arc-discharge techniques. In our particular example here, the CNT are formed by laser ablation. A target graphite rod consisting of 0.45 atomic % each of Nickel and Cobalt, placed in an oven heated at 1250° C., under 500 Torr of Argon gas flow, was ablated using the second-harmonics of a Nd:YAG pulse laser with energy of >300 mJ/pulse. At the ablated region on the carbon rod, at temperate >3000° C., the evaporated carbon atoms, assisted by the Ni/Co growth catalysts, condenses to form CNT. After laser ablation, the sample is heated (to a temperature of greater than or equal to about 120° C.) in a high vacuum to remove to vaporize substances such as fullerene with impurities. Next the sample is washed with toluene and filtered with fine mesh. Next, the sample is washed and dispersed with ethanol and mesh filtered. Next, the sample is mixed and dispersed with pure water and hydrogen peroxide is added to obtain a solution with 15% by volume of hydrogen peroxide. and heated at 100° C. in a recalculating container for 3 hours to remove amorphous carbon and then mesh filtered. The sample is then washed with diluted acid weak HCl solution) to remove the Co and Ni metal particles, and then mesh filtered, washed with base (a weak sodium hydroxide solution) to neutralize the acid and to remove other by products from the previous acid wash and mesh filtered. Finally, the sample is heated to 650° C. for one hour under vacuum to remove all the solvents. The sample is then allowed to cool down in room temperature. CNT samples with purity >90% with negligible metal catalysts impurities can be obtained following the above described processes.

Example 2

Device Elements Having Layers, Films or Coatings of CNT

Various methods can be applied to obtain layers, films or coatings of CNT on substrates as illustrates in the figures herein. For example, a sample of CNT powder can be mixed with any alcohol, preferably a volatile alcohol, such as ethanol, and sprayed onto a surface.

Layers containing CNT can also be prepared by mixing the CNT powder into an adhesive or glue, such as a U-V epoxy. Preferred adhesives are those that are transparent at the intended operating wavelength or wavelengths and have a low melting point. Similarly, layers of CNT can be formed in polymers or plastics, such as polyimide. A polymer such as a polyimide can be used to form a CNT layer on or between substrates. The amount of CNT added in a layer, film or coating depends on how much absorption is desired for a given application.

CNT powders can be introduced into optical fibers. For example, CNT can be mixed into a polymer solution, which is then heated, and draw into a fiber. Any plastic or polymer materials that can be used for forming optical fibers can be employed. The amount of CNT added depends on how much absorption is desired for a given application. A CNT composition (e.g., a polymer containing CNT) can be inserted into holey fiber or into photonic crystal fiber, for example, where the CNT material is inserted into a bore or cavity(ies) within the fiber or is introduced into air spacings within a fiber.

U.S. provisional application 60/435,577, filed Dec. 20, 2002 is incorporated by reference in its entirety herein. All Figures, figure captions of that application are incorporated by reference herein.

Those of ordinary skill in the art will appreciate that materials, methods and device elements other than those that have been specifically exemplified herein can be employed in the practice of this without resort to undue experimentation. Those of ordinary skill in the art will appreciate that there are art-known equivalents for the materials, methods and device elements that are specifically exemplified. All such art-recognized equivalents are intended to be encompassed by this invention.

All references cited herein are cited generally to provide information on the state of the art. More specifically references may be cited to provide specific information as indicated in the text of the specification. All references cited herein are incorporated by reference in their entirety herein and can provide among other information, details of the synthesis of carbon nanotubes by various methods, details of the operation of various laser configurations, descriptions of laser configurations that are known in the art; descriptions of optical elements and optical devices that are known in the art all of which may be employed in the practice of the invention as described herein.

REFERENCES

T. Ando, "Exciton in carbon nanotubes," J. Phys. Soc. Jpn., 66, 1066 (1997)

T. Brabec, et al., "Kerr lens mode-locking," Optics Letters, vol. 17, pp. 1292-1294, 1992.

Chemla et al. U.S. Pat. No. 4,597,638 "Nonlinear optical apparatus" July 1986

Y.-C. Chen et al. "Ultrafast Optical Switch Properties of Single-wall Carbon Nanotube Polymer Composites," CLEO p. 660, paper CFH4 (2002)a Y.-C. Chen et al. "Ultrafast Optical Switch Properties of Single-wall Carbon Nanotube Polymer Composites at 1.55 µm," Applied Physics Letts. 81(6):975-977 (2002)b N. J. Doran, D. Wood, "Non-linear optical loop mirror," Opt. Lett., 14, pp. 56-58 (1988).

I. N. Duling, ed., "Compact sources for ultrashort pulses," Cambridge University Press (1995) E. A. De Souza, et al., "Saturable absorber modelocked polarisation maintaining erbium-doped fibre laser," Electron. Lett., 29, pp. 447-449 (1993).

M. E. Fermann, "Ultrashort-pulse sources based on single-mode rare-earth-doped fibers," J. Appl. Phys. B, B58, pp. 197-209 (1994).

M. E. Fermann, et al., "Nonlinear amplifying loop mirror," Opt. Lett., 15, pp. 752-754 (1990).

P. J. F. Harris *Carbon Nanotubes and Related Structures*, Cambridge University Press (2000) (Cambridge, UK).

M. Ichida, et al., "Coulomb effects on the fundamental optical transition in semiconducting single-walled carbon nanotubes: Divergent behavior in the small diameter limit," Phys. Rev. B 65, (2002)

M. Ichida, et al., "Exciton effects of optical transitions in single-wall carbon nanotubes," J. Phys. Soc. Jpn., 68, pp. 3131-3133 (1999)

E. P. Ippen et al. U.S. Pat. No. 3,978,429 "Mode-locked Laser" August 1976

E. P. Ippen, et al., "Additive pulse modelocking," J. Optical Society of America B, Opt. Phys., vol. 6.\, pp. 1736-1745, 1989.

Kataura et al. (1999) Synthetic Metals "Optical Properties of Single-Walled Carbon Nanotubes" vol. 103:2555-2558.

Kataura et al. (2000) Carbon "Diameter control of single-walled carbon nanotubes" 38: 1691-1697.

U. Keller et al., "Solid-state low-loss intracavity saturable absorber for Nd:YLF lasers: an antiresonant semiconductor Fabry-Perot saturable absorber," Optics Letters, vol. 17, No. 7, Apr. 1, 1992, pp. 505-507.

U. Keller, et al., "Semiconductor saturable absorber mirrors (SESAM's) for femtosecond to nanosecond pulse generation in solid-state lasers," IEEE J. Select. Topics Quant. Electron., vol. 2, pp. 435-453, 1996.

J. Mark, et al., "Femtosecond pulse generation in a laser with a nonlinear external resonator," Optics Letters, vol. 14, pp. 48-50, 1989.

V. J. Matsas, et al., "Self starting passively mode-locked fibre ring soliton laser exploiting nonlinear polarisation rotation," Electron. Lett., 28, pp. 1391-1393 (1992).

Mauruyama et al., (2002) Chem. Phys. Lett. "Low-temperature synthesis of high-purity single-walled carbon nanotubes from alcohol" 360:229-234.

Y. Sakakibara, et al., "Near-infrared saturable absorption of single-wall carbon nanotubes prepared by laser ablation method," Jpn. J. Appl. Phys., 42, pp. 494-496 (2003).

S. Y. Set, et al., "A noise suppressing saturable absorber at 1550 nm based on carbon nanotube technology," OFC'03, Atlanta, 23-28 March, paper FL2 (2003)a.

S. Y. Set, et al., "Mode-locked fiber lasers based on a saturable absorber incorporating carbon nanotubes" OFC'03, Atlanta, 23-28 March, Post-deadline Paper PD44 (2003)b.

S. Y. Set, et al., "A dual-regime mode-locked/Q-switched laser using a saturable absorber incorporating carbon nanotubes (SAINT)" in Proc. CLEO'03, Baltimore, Md., 2003c, paper PDC-A13.

D. E. Spence, et al., "60-fsec pulse generation from a self-mode-locked Ti:Sapphire laser," Optics Letters, vol. 16, pp. 42-44, 1991.

S. Tatsuura, et al., "Semiconductor Carbon Nanotubes as Ultrafast Switching Materials for Optical Telecommunications", Adv. Mater., 15, p. 534-537 (2003).

D. Tomanek and R. Enbody (eds) *Science and Application of Nanotubes,* (2000) Kluwer Academic Publisher (Higham, Mass.).

J. W. G. Wildöer, et. al. (1998) "Electronic structure of atomically resolved carbon nanotubes," Nature 391, 59-62.

W. S. Wong, et al., "Self-switching of optical pulses in dispersion-imbalanced nonlinear loop mirrors," Opt. Lett., 22, pp. 1150-1152 (1997).

The invention claimed is:

1. A laser for generating light pulses at a selected operating wavelength or range of wavelengths and a selected fundamental repetition frequency comprising:

(a) one or more optical resonators or a closed optical path where a light pulse can build up over multiple round trips; wherein the one or more resonators or the closed optical path comprises one or more gain mediums and wherein the round trip path length is selected to give the selected fundamental repetition frequency;

(b) one or more pump light sources;

(c) one or more optical couplers for coupling pump light from the pump light source into the one or more gain mediums to provide optical gain at the selected operating wavelength or range of wavelengths;
(d) one or more nonlinear optical or saturable absorber elements optically coupled with the one or more optical resonators or the closed optical path and
(e) one or more optical couplers for coupling light pulses out of the laser wherein one or more of the saturable absorber elements comprise carbon nanotubes, and wherein at least one of the non-linear optical or saturable absorber elements is a mode locker and the laser is self-starting and mode-locked.

2. The laser of claim 1 further comprising a wavelength tuning element optically coupled with the one or more optical resonators or the closed optical path.

3. The laser of claim 1 wherein the one or more nonlinear optical or saturable absorber elements comprising carbon nanotubes is positioned within one of the one or more optical resonators or within closed optical path.

4. The laser of claim 1 wherein the wavelength tuning element is positioned within one of the one or more optical resonators or within the closed optical path.

5. The laser of any of claim 1 in a hybrid mode-locking configuration, which further comprises an active mode-locking device which cooperates with the one more nonlinear optical or saturable absorber element to produce optical pulses.

6. A laser for generating light pulses at a selected operating wavelength or range of wavelengths and a selected fundamental repetition frequency comprising:
(a) one or more optical resonators or a closed optical oath where a light pulse can build up over multiple round trips; wherein the one or more resonators or the closed optical path comprises one or more gain mediums and wherein the round trip oath length is selected to give the selected fundamental repetition frequency:
(b) one or more rump light sources:
(c) one or more optical couplers for coupling rump light from the rump light source into the one or more gain mediums to provide optical gain at the selected operating wavelength or range of wavelengths;
(d) one or more nonlinear optical or saturable absorber elements optically coupled with the one or more optical resonators or the closed optical path and
(e) one or more optical couplers for coupling light pulses out of the laser wherein one or more of the saturable absorber elements comprise carbon nanotubes, which is passively Q-switched wherein the one or more nonlinear optical or saturable absorber elements is employed as a Q-spoiler.

7. The laser of any of claim 1 capable of generating optical pulses of length about 1 picosecond or less.

8. A laser for generating light pulses at a selected operating wavelength or range of wavelengths and a selected fundamental repetition frequency comprising:
(a) one or more optical resonators or a closed optical oath where a light pulse can build up over multiple round trips; wherein the one or more resonators or the closed optical path comprises one or more gain mediums and wherein the round trip oath length is selected to give the selected fundamental repetition frequency;
(b) one or more rump light sources;
(c) one or more optical couplers for coupling rump light from the rump light source into the one or more gain mediums to provide optical gain at the selected operating wavelength or range of wavelengths;
(d) one or more nonlinear optical or saturable absorber elements optically coupled with the one or more optical resonators or the closed optical oath and
(e) one or more optical couplers for coupling light pulses out of the laser wherein one or more of the saturable absorber elements comprise carbon nanotubes, wherein the laser is capable of generating pulses having energy higher than about 35 pJ per pulse or capable of generating pulses having a peak power higher than about 35 W.

9. The laser of any of claim 1 wherein the carbon nanotubes comprise single-walled carbon nanotubes (SWNT).

10. The laser of claim 1 wherein the carbon nanotubes are provided in a layer less than or equal to about 10 microns in thickness.

11. A laser for generating light pulses at a selected operating wavelength or range of wavelengths and a selected fundamental repetition frequency comprising:
(a) one or more optical resonators or a closed optical path where a light pulse can build up over multiple round trips; wherein the one or more resonators or the closed optical path comprises one or more gain mediums and wherein the round trip path length is selected to give the selected fundamental repetition frequency;
(b) one or more pump light sources;
(c) one or more optical couplers for coupling pump light from the pump light source into the one or more gain mediums to provide optical gain at the selected operating wavelength or range of wavelengths;
(d) one or more nonlinear optical or saturable absorber elements optically coupled with the one or more optical resonators or the closed optical path and
(e) one or more optical couplers for coupling light pulses out of the laser wherein one or more of the saturable absorber elements or devices comprise carbon nanotubes;
wherein the carbon nanotubes are provided in a layer the thickness of which is varied to adjust the mode-locking and Q-switching threshold optical energy.

12. The laser of any of claim 1 wherein the carbon nanotubes comprise 50% or more by weight of semiconductor carbon nanotubes.

13. The laser of any of claim 1 wherein the diameters of the carbon nanotubes are selected to exhibit an exciton absorption in the operating wavelength range of the laser.

14. A laser-mode locking element comprising one or more layers containing carbon nanotubes; wherein the lesser mode locking element is optically coupled to the resonator of the lesser and operating the lesser in the mode-locked regime.

15. The element of claim 14 wherein the carbon nanotubes are SWNTs.

16. The element or device of any of claim 14 wherein the diameter of the carbon nanotubes are selected so that the element absorbs within a desired operating wavelength range.

17. The element of claim 14 wherein the carbon nanotubes are selected to have a range of different diameters to provide a wide operating bandwidth.

18. The element of claim 14 capable of operation in both reflection and transmission mode.

19. A laser-mode locking element comprising one or more layers containing carbon nanotubes; wherein the carbon nanotubes are provided in a layer the thickness of which is varied to adjust the mode-locking and/or Q-switching threshold optical energy.

20. The element of claim 14 wherein a layer of carbon nanotubes is provided on a substrate surface.

21. The element of claim 20 wherein the other surface of the substrate is provided with an AR (anti-reflection) coating, a bandpass filter, or a half-mirror.

22. A mode-locked pulsed laser comprising a laser-mode locking element comprising one or more layers containing carbon nanotubes which functions for mode-locking of the pulsed laser; wherein the lesser mode locking element is optically coupled to the resonator of the lesser.

23. A method for generating light pulses in a laser which comprises the step of providing a laser-mode locking element of claim 14 which comprises carbon nanotubes and which is optically coupled to the resonator of the laser and operating the laser in the mode-locked regime.

24. A method for generating optical pulses in a laser which comprises the step of Q-switching a laser of claim 1.

25. The laser of claim 1 wherein the one or more nonlinear optical or saturable absorber elements containing carbon nanotubes are waveguides.

26. The laser of claim 1 wherein the one or more nonlinear optical or saturable absorber elements containing carbon nanotubes are optical fibers.

27. The element of claim 14 wherein the carbon nanotubes are in a waveguide.

28. The element of claim 14 wherein the carbon nanotubes are in an optical fiber.

29. A mode-locked pulsed laser comprising the mode-locking element of claim 19.

30. A mode-locked pulsed laser of claim 1 operating in the picosecond or sub-picosecond regimes.

31. A mode-locked pulsed laser of claim 22 operating in the picosecond or sub-picosecond regimes.

32. The laser of claim 1 which is an Er-doped fiber laser.

33. The laser of claim 32 which is a ring laser.

* * * * *

UNITED STATES PATENT AND TRADEMARK OFFICE
CERTIFICATE OF CORRECTION

| | | |
|---|---|---|
| PATENT NO. | : 7,372,880 B2 | Page 1 of 1 |
| APPLICATION NO. | : 10/537900 | |
| DATED | : May 13, 2008 | |
| INVENTOR(S) | : Mark Kenneth Jablonski et al. | |

It is certified that error appears in the above-identified patent and that said Letters Patent is hereby corrected as shown below:

Column 22, line 48, please replace "lesser" with --laser--.

Column 22, line 50, please replace "lesser" with --laser--. (both)

Column 23, line 9, please replace "lesser" with --laser--.

Column 23, line 10, please replace "lesser" with --laser--.

Signed and Sealed this

Twelfth Day of October, 2010

David J. Kappos
*Director of the United States Patent and Trademark Office*